US008107453B2

(12) United States Patent
Aramaki et al.

(10) Patent No.: US 8,107,453 B2
(45) Date of Patent: Jan. 31, 2012

(54) MOBILE COMMUNICATION CONTROL METHOD, MOBILE TERMINAL, AND ACCESS ROUTER

(75) Inventors: Takashi Aramaki, Kanagawa (JP); Takako Hori, Kanagawa (JP); Jun Hirano, Kanagawa (JP)

(73) Assignee: Panasonic Corporation, Osaka (JP)

( * ) Notice: Subject to any disclaimer, the term of this patent is extended or adjusted under 35 U.S.C. 154(b) by 798 days.

(21) Appl. No.: 12/280,679

(22) PCT Filed: Feb. 27, 2007

(86) PCT No.: PCT/JP2007/053680
§ 371 (c)(1),
(2), (4) Date: Aug. 25, 2008

(87) PCT Pub. No.: WO2007/099969
PCT Pub. Date: Sep. 7, 2007

(65) Prior Publication Data
US 2009/0010236 A1    Jan. 8, 2009

(30) Foreign Application Priority Data
Feb. 28, 2006    (JP) .................................. 2006-053924

(51) Int. Cl.
*H04W 4/00*    (2009.01)
(52) U.S. Cl. ....................................................... 370/338
(58) Field of Classification Search .......................... None
See application file for complete search history.

(56) References Cited

U.S. PATENT DOCUMENTS 6,304,546 B1 * 10/2001 Natarajan et al. ............. 370/216
6,453,349 B1 *  9/2002 Kano et al. .................... 709/226
6,826,182 B1 * 11/2004 Parthasarathy ................ 370/390
7,376,743 B1 *  5/2008 Bazzinotti et al. ............ 709/229
2002/0172207 A1 * 11/2002 Saito et al. .................... 370/400

(Continued)

FOREIGN PATENT DOCUMENTS
JP    2003-188894    7/2003

(Continued)

OTHER PUBLICATIONS
International Search Report dated Jun. 19, 2007.

(Continued)

*Primary Examiner* — Hassan Phillips
*Assistant Examiner* — Prenell Jones
(74) *Attorney, Agent, or Firm* — Dickinson Wright PLLC

(57) ABSTRACT

A technology is disclosed that provides a mobile communication control method, a mobile terminal, and an access router that allow communication to be continued after a handover without newly establishing all protocol states from the beginning. The technology includes a step at which a mobile node 100 transmits a sustain request message to an access router via any of a plurality of interfaces. The access router holds communication environment information related to communication performed via a first access router 200 and configured to expire after an elapse of a predetermined amount of time. The sustain request message stops the communication environment information from expiring after the elapse of the predetermined amount of time. The technology also includes a step at which the access router that has received the sustain request message resets the elapsing predetermined amount of time until expiration based on the sustain request message. The technology also includes a step at which the second access router 201 establishes a communication environment for a communication by the mobile node performed via the second access router itself based on the sustained communication environment information.

38 Claims, 15 Drawing Sheets

U.S. PATENT DOCUMENTS

| | | | |
|---|---|---|---|
| 2003/0087646 A1 | 5/2003 | Funato | |
| 2005/0058097 A1* | 3/2005 | Kang et al. | 370/329 |
| 2005/0239461 A1 | 10/2005 | Verma | |
| 2007/0110009 A1 | 5/2007 | Bachmann | |
| 2008/0031183 A1* | 2/2008 | Aso et al. | 370/328 |

FOREIGN PATENT DOCUMENTS

| | | |
|---|---|---|
| JP | 2003-304571 | 10/2003 |
| JP | 2005-531223 | 10/2005 |
| WO | 2005/051026 | 6/2005 |

OTHER PUBLICATIONS

J. Loughney et al., "Context Transfer Protocol," (draft-ietf-seamoby-ctp-11.txt), Internet Draft, Internet Engineering Task Force, Work in Progress, Aug. 2004, pp. 1-33.

M. Liebsch, et al., "Candidate Access Ruter Discovery," (draft-ietf-seamoby-card-protocol-08.txt), Internet Draft, Internet Engineering Task Force, Work in Progress, Sep. 2004, pp. 1-47.

* cited by examiner

MOBILE COMMUNICATION CONTROL METHOD, MOBILE TERMINAL, AND ACCESS ROUTER

TECHNICAL FIELD

The present invention relates to a mobile communication control method, a mobile terminal, and an access router used when a mobile terminal communicates over an area configured by a plurality of different communication networks.

BACKGROUND ART

Since the past, a technology has been known in which a mobile terminal having a plurality of interfaces communicates with a correspondent node while moving between a plurality of different communication networks. The different communication networks are, for example, a third generation (3G) cellular network and a wireless local area network (WLAN). Two different communication networks are used in the descriptions below. However, the communication networks are not limited to two different communication networks. Many more different communication networks can also be used. The different communication networks here refer to, for example, communication networks with different types of wireless connections (communication networks actualizing a handover between different types of networks) and communication networks with different administrators (communication networks actualizing roaming). As shown in FIG. 12, a mobile terminal 10 (mobile node [MN]) having two interfaces, one for the 3G cellular network (also referred to, herein, as simply 3G) and another for the WLAN, communicates while moving over an area configured by the 3G and the WLAN. Context transfer protocol (CTP) (refer to Non-patent Document 1, below) is proposed for a seamless, fast handover such as this. It is preferable for a mobile node user if communication can be performed in a state of constant connection and at a higher data rate when required.

Here, conventionally, when the MN 10 performs a handover, the MN 10 is required to perform all processes in a protocol flow to receive service (internet protocol security association [IPsec SA] among the MN 10, an access router [AR], a correspondent node [CN: correspondent node], and a home agent [HA]; quality of service [QoS] state securement between the MN 10 and a QoS Next Steps in Signaling [NSIS] entity [QNE] that is a router recognizing NSIS QoS; header compression [HC]; and the like), as shown in FIG. 13. However, a large load is applied when the processes are performed from the beginning, thereby requiring processing time. Therefore, the above-described CTP is used. The CTP assumes that context data (CTD) remains held between the MN 10 and an AR to which the MN 10 connects. The CTD is information on an environment set between the MN 10 and the AR, and the like. The CTD refers to, for example, authentication authorization accounting (AAA) information, information related to QoS, header compression information, and information on IPsec SA and the like among the MN 10, the AR, and the CN.

As shown in FIG. 14, the MN 10 and a previous AR (pAR) hold context information related to the CTD between the MN 10 and the pAR. The pAR is an AR before movement of the MN 10. When the MN 10 performs a handover, the MN 10 transmits a context act request (CTAR) to a new AR (nAR) based on a certain trigger. The nAR is an AR at a new connection destination. The CTAR instructs the nAR to acquire the CTD from the pAR. At this time, the CTAR can include information related to the pAR, context information, and the like. The nAR that has received the CTAR transmits a CT-req to the pAR. The CR-req indicates a CTD acquisition request. The pAR transmits the CTD held by the pAR itself to the nAR, based on the reception of the CT-req. As a result, a required protocol state can be quickly re-established without all processes of the protocol flow being performed from the beginning. The method can also be actualized when the MN 10 or the pAR does not hold context information, such as that described above. However, in this case, it is assumed that trust exists among the three parties, the MN 10, the pAR, and the nAR.

Other methods for circumventing the above-described problem of time being required because of the conventional handover will be described with reference to FIG. 15. As shown in FIG. 15, the MN 10 starts the handover based on a certain trigger. At this time, the MN 10 transmits a CTAR to the pAR. The pAR that has received the CTAR transmits a candidate access router discovery (CARD) req to a CARD database. The CARD database holds CARD information (refer to Non-patent Document 2, below). The CARD req is an acquisition request for acquiring the CARD information. The pAR acquires the CARD information through a CARD reply from the CARD database. The CARD information refers to information used to predict information on an AR that becomes a candidate for a next connection destination of the MN 10, and the like. The pAR transmits the CTD to the nAR based on the CARD information. Then, when the MN 10 completes the handover, the MN 10 transmits a CTAR (for confirmation) to the nAR. As a result, the CTD may be transmitted to the nAR before the handover is completed. The required protocol state can be re-established more quickly.

Non-patent Document 1: J. Loughney (editor) et al., "Context Transfer Protocol (draft-ietf-seamoby-ctp-11.txt)", Internet Draft, Internet Engineering Task Force, Work in Progress.

Non-patent Document 2: Marco Liebsch (editor) et al., "Candidate Access Router Discovery (draft-ieft-seamoby-card-protocol-08.txt)", Internet Draft, Internet Engineering Task Force, Work in Progress.

However, the handover performed by the MN 10 requires time. In other words, time is required to search a layer 1, re-establish a protocol state of a layer 2, re-establish protocol states of a layer 3 and higher layers, and the like. Moreover, a hot spot covered by the WLAN may not be disposed within the 3G. In other words, the nAR may be present at a significant distance from the pAR. As can be seen in computer processing (refer to Non-patent Document 1, above), when the CTD becomes dormant (enters a dormant state) after an elapse of a predetermined amount of time to conserve resources such as main memory, and subsequently expires after further elapse of a predetermined amount of time, the CTD does not expire in a situation shown in FIG. 16A because the pAR transmits the CTD to the nAR before the CTD expires. However, the CTD expires in a situation shown in FIG. 16B because the predetermined amount of time elapses before the CTD from the pAR reaches the nAR. In this way, when the pAR is present at a significant distance (far) from the nAR, a situation such as that shown in FIG. 16B may occur. When the CTD expires because CTD transfer is unsuccessful, the protocol state is required to be re-established (set up) as shown in FIG. 17. Time is required, and communication cannot be performed at a requested data rate.

DISCLOSURE OF THE INVENTION

The present invention has been achieved to solve the above-described problems. An object of the present invention is to provide a mobile communication control method, a mobile terminal, and an access router that allow communication to be continued after a handover, without newly establishing all protocol states from the beginning.

To achieve the above-described object, the present invention provides a mobile communication control method for allowing continuous and efficient communication when a mobile node having a plurality of interfaces respectively corresponding to a plurality of different communication networks and performing communication over respective areas of the plurality of different communication networks via the respectively corresponding plurality of interfaces performs communication with a correspondent node via a first access router configuring a subnet of a predetermined communication network among the plurality of different communication networks and, as a result of a subsequent handover by the mobile node, performs communication with the correspondent node via a second access router configuring another subnet of the predetermined communication network. The mobile communication control method includes a step at which the mobile node transmits a sustain request message to an access router via any of the plurality of interfaces. The access router holds communication environment information related to an environment of communication performed via the first access router and configured to expire after an elapse of a predetermined amount of time. The sustain request message stops the communication environment information from expiring after the elapse of the predetermined amount of time. The mobile communication control method includes a step at which the access router that has received the sustain request message resets the elapsing predetermined amount of time until expiration based on the sustain request message. The mobile communication control method includes a step at which the second access router establishes a communication environment for communication by the mobile node performed via the second access router itself based on the sustained communication environment information. As a result of the configuration, communication can be continued after the handover without all protocol states being newly established from the beginning.

In addition, in the mobile communication control method of the present invention, a preferred aspect of the present invention is that the mobile node periodically transmits the sustain request message at a time interval shorter than the predetermined amount of time required until the communication environment information expires. As a result of the configuration, the communication environment information can be prevented from expiring.

In addition, in the mobile communication control method of the present invention, a preferred aspect of the present invention is that the mobile node transmits the sustain request message to the first access router via any of the plurality of interfaces until the handover by the mobile node itself is completed. The first access router holds the communication environment information. As a result of the configuration, the communication environment information can be prevented from expiring before the communication environment information is transferred to the second access router.

In addition, in the mobile communication control method of the present invention, a preferred aspect of the present invention is that the mobile node transmits a communication environment information acquisition message to the second access router instructing acquisition of the communication environment information held by the first access router. The mobile node transmits the sustain request message to the second access router via any of the plurality of interfaces, the second access router having acquired the communication environment information based on the communication environment information acquisition message. As a result of the configuration, communication can be more quickly established after the handover by the mobile node.

In addition, in the mobile communication control method of the present invention, a preferred aspect of the present invention is that the first access router transmits a notification to the mobile node that the communication environment information has been transmitted to the second access router. As a result of the configuration, the mobile node can determine a timing at which to transmit the sustain request message.

In addition, in the mobile communication control method of the present invention, a preferred aspect of the present invention is that the mobile node transmits the sustain request message to the first access router holding the communication environment information via any of the plurality of interfaces until the handover by the mobile node itself is completed. The mobile node transmits a communication environment information acquisition message to the second access router after the handover is completed. The communication environment information acquisition message instructs acquisition of the communication environment information held by the first access router. The mobile node transmits the sustain request message to the second access router via any of the plurality of interfaces, the second access router having acquired the communication environment information based on the communication environment information acquisition message. As a result, the communication environment information can be prevented from expiring regardless of whether the communication environment information is held by the first access router or the second access router.

In addition, in the mobile communication control method of the present invention, a preferred aspect of the present invention is that the first access router transmits a notification to the mobile node that the communication environment information has been transmitted to the second access router. As a result of the configuration, the mobile node can determine a timing at which to transmit the sustain request message.

In addition, in the mobile communication control method of the present invention, a preferred aspect of the present invention is that the mobile node acquires prediction information from an access router prediction information providing terminal that provides the prediction information for predicting an access router of a handover destination. The mobile node transmits a communication environment information acquisition message to the second access router based on the acquired prediction information. The communication environment information acquisition message instructs acquisition of the communication environment information held by the first access router. The mobile node transmits the sustain request message to the second access router via any of the plurality of interfaces, the second access router having acquired the communication environment information based on the received communication environment information acquisition message. As a result of the configuration, the handover destination can be easily predicted, and the communication can be more quickly established after the handover by the mobile node.

In addition, in the mobile communication control method of the present invention, a preferred aspect of the present invention is that the first access router transmits a notification to the mobile node that the communication environment information has been transmitted to the second access router. As a result of the configuration, the mobile node can determine a timing at which to transmit the sustain request message.

In addition, in the mobile communication control method of the present invention, a preferred aspect of the present invention is that the mobile node transmits the sustain request message to the first access router holding the communication environment information via any of the plurality of interfaces. The mobile node transmits a communication environment information acquisition message to the second access router based on prediction information acquired from an access router prediction information providing terminal that provides the prediction information for predicting an access router of a handover destination. The communication environment information acquisition message instructs acquisition of the communication environment information held by the first access router. The mobile node transmits the sustain request message to the second access router via any of the plurality of interfaces, the second access router having acquired the communication environment information based on the received communication environment information acquisition message. As a result of the configuration, the handover destination can be easily predicted, and the communication environment information can be prevented from expiring regardless of whether the communication environment information is held by the first access router or the second access router.

In addition, in the mobile communication control method of the present invention, a preferred aspect of the present invention is that the first access router transmits a notification to the mobile node that the communication environment information has been transmitted to the second access router. As a result of the configuration, the mobile node can determine a timing at which to transmit the sustain request message.

The present invention provides a mobile communication control method for allowing continuous and efficient communication when a mobile node having a plurality of interfaces respectively corresponding to a plurality of different communication networks and performing communication over respective areas of the plurality of different communication networks via the respectively corresponding plurality of interfaces performs communication with a correspondent node via a first access router configuring a subnet of a predetermined communication network among the plurality of different communication networks and, as a result of a subsequent handover by the mobile node, performs communication with the correspondent node via a second access router configuring another subnet of the predetermined communication network. The mobile communication control method includes a step at which the mobile node transmits a communication environment information acquisition message to the second access router via a predetermined interface among the plurality of interfaces, before communication environment information held by the first access router expires after an elapse of a predetermined amount of time. The first access router holds the communication environment information related to an environment of communication performed via the first access router and configured to expire after the elapse of the predetermined amount of time. The communication environment information acquisition message instructs acquisition of the communication environment information. The mobile communication control method includes a step at which the second access router acquires the communication environment information from the first access router based on the communication environment information acquisition message, and establishes a communication environment for communication by the mobile node performed via the second access router itself based on the acquired communication environment information. As a result of the configuration, communication can be continued after the handover, without all protocol states being newly established from the beginning.

In addition, in the mobile communication control method of the present invention, a preferred aspect of the present invention is that the mobile node decides the second access router to which to transmit the communication environment information acquisition message based on prediction information acquired from an access router prediction information providing terminal that provides the prediction information for predicting an access router of a handover destination. As a result of the configuration, the handover destination of the mobile node can be easily predicted.

The present invention provides a mobile node used in a mobile communication control method for allowing continuous and efficient communication when the mobile node having a plurality of interfaces respectively corresponding to a plurality of different communication networks and performing communication over respective areas of the plurality of different communication networks via the respectively corresponding plurality of interfaces performs communication with a correspondent node via a first access router configuring a subnet of a predetermined communication network among the plurality of different communication networks and, as a result of a subsequent handover by the mobile node, performs communication with the correspondent node via a second access router configuring another subnet of the predetermined communication network. The mobile node includes a generating means that generates a sustain request message for an access router holding communication environment information related to an environment of communication performed via the first access router and configured to expire after an elapse of a predetermined amount of time. The sustain request message stops the communication environment information from expiring after the elapse of the predetermined amount of time. The mobile node includes a transmitting means that transmits the generated sustain request message via any of the plurality of interfaces. As a result of the configuration, communication can be continued after the handover, without all protocol states being newly established from the beginning.

In addition, in the mobile node of the present invention, a preferred aspect of the present invention is that the transmitting means periodically transmits the sustain request message at a time interval shorter than the predetermined amount of time until the communication environment information expires. As a result of the configuration, the communication environment information can be prevented from expiring.

In addition, in the mobile node of the present invention, a preferred aspect of the present invention is that the transmitting means transmits the sustain request message to the first access router holding the communication environment information via any of the plurality of interfaces until the handover by the mobile node itself is completed. As a result of the configuration, the communication environment information can be prevented from expiring before the communication environment information is transferred to the second access router.

In addition, in the mobile node of the present invention, a preferred aspect of the present invention is that the transmitting means transmits a communication environment information acquisition message to the second access router. The communication environment information acquisition message instructs acquisition of the communication environment information held by the first access router. The transmitting means transmits the sustain request message to the second access router via any of the plurality of interfaces, the second access router having acquired the communication environment information based on the communication environment information acquisition message. As a result of the configuration, communication can be more quickly established after the handover by the mobile node.

In addition, in the mobile node of the present invention, a preferred aspect of the present invention is that the mobile node further includes a receiving means that receives a message from an external source. The receiving means receives a notification from the first access router that the communication environment information has been transmitted to the second access router. As a result of the configuration, the mobile node can determine a timing at which to transmit the sustain request message.

In addition, in the mobile node of the present invention, a preferred aspect of the present invention is that the transmitting means transmits the sustain request message to the first access router holding the communication environment information via any of the plurality of interfaces until the handover by the mobile node itself is completed. The transmitting means transmits a communication environment information acquisition message to the second access router after the handover is completed. The communication environment information acquisition message instructs acquisition of the communication environment information held by the first access router. The transmitting means transmits the sustain request message to the second access router via any of the plurality of interfaces, the second access router having acquired the communication environment information based on the communication environment information acquisition message. As a result of the configuration, the communication environment information can be prevented from expiring regardless of whether the communication environment information is held by the first access router or the second access router.

In addition, in the mobile node of the present invention, a preferred aspect of the present invention is that the mobile node further includes a receiving means that receives a message from an external source. The receiving means receives a notification from the first access router that the communication environment information has been transmitted to the second access router. As a result of the configuration, the mobile node can determine a timing at which to transmit the sustain request message.

In addition, in the mobile node of the present invention, a preferred aspect of the present invention is that the transmitting means acquires prediction information from an access router prediction information providing terminal that provides the prediction information predicting an access router of a handover destination. The transmitting means transmits a communication environment information acquisition message to the second access router based on the acquired prediction information. The communication environment information acquisition message instructs acquisition of the communication environment information held by the first access router. The transmitting means transmits the sustain request message to the second access router via any of the plurality of interfaces, the second access router having acquired the communication environment information based on the received communication environment information acquisition message. As a result of the configuration, the handover destination can be easily predicted, and communication can be more quickly established after the handover by the mobile node.

In addition, in the mobile node of the present invention, a preferred aspect of the present invention is that the mobile node further includes a receiving means that receives a message from an external source. The receiving means receives a notification from the first access router that the communication environment information has been transmitted to the second access router. As a result of the configuration, the mobile node can determine a timing at which to transmit the sustain request message.

In addition, in the mobile node of the present invention, a preferred aspect of the present invention is that the transmitting means transmits the sustain request message to the first access router holding the communication environment information via any of the plurality of interfaces. The transmitting means transmits a communication environment information acquisition message to the second access router based on prediction information acquired from an access router prediction information providing terminal that provides the prediction information predicting an access router of a handover destination. The communication environment information acquisition message instructs acquisition of the communication environment information held by the first access router. The transmitting means transmits the sustain request message to the second access router via any of the plurality of interfaces, the second access router having acquired the communication environment information based on the received communication environment information acquisition message. As a result of the configuration, the handover destination can be easily predicted, and the communication environment information can be prevented from expiring regardless of whether the communication environment information is held by the first access router or the second access router.

In addition, in the mobile node of the present invention, a preferred aspect of the present invention is that the mobile node further includes a receiving means that receives a message from an external source. The receiving means receives a notification from the first access router that the communication environment information has been transmitted to the second access router. As a result of the configuration, the mobile node can determine a timing at which to transmit the sustain request message.

The present invention provides a mobile node used in a mobile communication control method for allowing continuous and efficient communication when the mobile node having a plurality of interfaces respectively corresponding to a plurality of different communication networks and performing communication over respective areas of the plurality of different communication networks via the respectively corresponding plurality of interfaces performs communication with a correspondent node via a first access router configuring a subnet of a predetermined communication network among the plurality of different communication networks and, as a result of a subsequent handover by the mobile node, performs communication with the correspondent node via a second access router configuring another subnet of the predetermined communication network. The mobile node includes a generating means that generates a communication environment information acquisition message for the second access router before the communication environment information held by the first access router expires after an elapse of a predetermined amount of time. The first access router holds the communication environment information related to an environment of communication performed via the first access router and configured to expire after the elapse of the predetermined amount of time. The communication environment information acquisition message instructs acquisition of the communication environment information. The mobile node includes a transmitting means that transmits the generated communication environment information acquisition message via a predetermined interface among the plurality of interfaces. As a result of the configuration, communication can be continued after the handover, without all protocol states being newly established from the beginning.

In addition, in the mobile node of the present invention, a preferred aspect of the present invention is that the mobile node further includes a deciding means that decides the second access router to which to transmit the communication environment information acquisition message based on prediction information acquired from an access router prediction information providing terminal that provides the prediction information for predicting an access router of a handover destination. As a result of the configuration, the handover destination of the mobile node can be easily predicted.

The present invention provides an access router used in a mobile communication control method for allowing continuous and efficient communication when a mobile node having a plurality of interfaces respectively corresponding to a plurality of different communication networks and performing communication over respective areas of the plurality of different communication networks via the respectively corresponding plurality of interfaces performs communication with a correspondent node via a first access router configuring a subnet of a predetermined communication network among the plurality of different communication networks and, as a result of a subsequent handover by the mobile node, performs communication with the correspondent node via a second access router configuring another subnet of the predetermined communication network. When the access router performs processes as the first access router, the access router receives a sustain request message from the mobile node via any of the plurality of interfaces until the handover by the mobile node is completed. The sustain request message stops communication environment information from expiring after an elapse of a predetermined amount of time. The communication environment information is related to an environment of communication performed via the first access router and configured to expire after the elapse of the predetermined amount of time. The access router resets the elapsing predetermined amount of time until expiration when the sustain request message is received. When the access router performs processes as the second access router, the access router acquires the communication environment information sustained in the first access router. The access router establishes a communication by the mobile node performed via the access router itself based on the acquired communication environment information. As a result of the configuration, communication can be continued after the handover, without all protocol states being newly established from the beginning.

The present invention provides an access router used in a mobile communication control method for allowing continuous and efficient communication when a mobile node having a plurality of interfaces respectively corresponding to a plurality of different communication networks and performing communication over respective areas of the plurality of different communication networks via the respectively corresponding plurality of interfaces performs communication with a correspondent node via a first access router configuring a subnet of a predetermined communication network among the plurality of different communication networks and, as a result of a subsequent handover by the mobile node, performs communication with the correspondent node via a second access router configuring another subnet of the predetermined communication network. When the access router performs processes as the second access router, the access router receives a communication environment information acquisition message from the mobile node. The communication information acquisition message instructs acquisition of communication environment information held by the first access router. The communication environment information is related to an environment of communication performed via the first access router and configured to expire after an elapse of a predetermined amount of time. The access router acquires the communication environment information based on the received communication environment information acquisition message. The access router receives a sustain request message from the mobile node via any of the plurality of interfaces. The sustain request message stops the communication environment information from expiring after the elapse of the predetermined amount of time. The access router resets the elapsing predetermined amount of time until expiration when the sustain request message is received. The access router establishes a communication environment of a communication by the mobile node performed via the access router itself based on the sustained communication environment information. As a result of the configuration, communication can be continued after the handover, without all protocol states being newly established from the beginning.

In addition, in the access router of the present invention, a preferred aspect of the present invention is that, when the access router performs processes as the first access router, the access router notifies the mobile node that the communication environment information has been acquired, after the second access router has acquired the communication environment information. As a result of the configuration, the mobile node can determine a timing at which to transmit the sustain request message.

The present invention provides an access router used in a mobile communication control method for allowing continuous and efficient communication when a mobile node having a plurality of interfaces respectively corresponding to a plurality of different communication networks and performing communication over respective areas of the plurality of different communication networks via the respectively corresponding plurality of interfaces performs communication with a correspondent node via a first access router configuring a subnet of a predetermined communication network among the plurality of different communication networks and, as a result of a subsequent handover by the mobile node, performs communication with the correspondent node via a second access router configuring another subnet of the predetermined communication network. When the access router performs processes as the first access router, the access router receives a sustain request message from the mobile node via any of the plurality of interfaces until the handover by the mobile node is completed. The sustain request message stops communication environment information from expiring after an elapse of a predetermined amount of time. The communication environment information is related to an environment of communication performed via the first access router and configured to expire after the elapse of the predetermined amount of time. The access router resets the elapsing predetermined amount of time until expiration when the sustain request message is received. When the access router performs processes as the second access router, the access router receives a communication environment information acquisition message from the mobile node. The communication environment information acquisition message instructs acquisition of the communication environment information held by the first access router. The access router acquires the communication environment information based on the received communication environment information acquisition message. The access router receives the sustain request message from the mobile node via any of the plurality of interfaces. The access router resets the elapsing predetermined amount of time until expiration when the sustain request message is received. The access router establishes a communication environment of a communication by the mobile node performed via the access router itself based on the sustained communication environment information. As a result of the configuration, communication can be continued after the handover without all protocol states being newly established from the beginning.

In addition, in the access router of the present invention, a preferred aspect of the present invention is that, when the access router performs processes as the first access router, the access router notifies the mobile node that the communication environment information has been acquired, after the second access router has acquired the communication environment information. As a result of the configuration, the mobile node can determine a timing at which to transmit the sustain request message.

The present invention provides an access router used in a mobile communication control method for allowing continuous and efficient communication when a mobile node having a plurality of interfaces respectively corresponding to a plurality of different communication networks and performing communication over respective areas of the plurality of different communication networks via the respectively corresponding plurality of interfaces performs communication with a correspondent node via a first access router configuring a subnet of a predetermined communication network among the plurality of different communication networks and, as a result of a subsequent handover by the mobile node, performs communication with the correspondent node via a second access router configuring another subnet of the predetermined communication network. When the access router performs processes as the second access router, the access router receives a communication environment information acquisition message from the mobile node. The communication environment information acquisition message instructs acquisition of communication environment information held by the first access router. The communication environment information is related to an environment of communication performed via the first access router and configured to expire after an elapse of a predetermined amount of time. The access router acquires the communication environment information based on the received communication environment information acquisition message. The access router receives a sustain request message from the mobile node via any of the plurality of interfaces. The sustain request message stops the communication environment information from expiring after the elapse of the predetermined amount of time. The access router resets the elapsing predetermined amount of time until expiration when the sustain request message is received. The access router establishes a communication environment of a communication by the mobile node performed via the access router itself based on the sustained communication environment information. As a result of the configuration, communication can be continued without all protocol states being newly established from the beginning.

In addition, in the access router of the present invention, a preferred aspect of the present invention is that, when the access router performs processes as the first access router, the access router notifies the mobile node that the communication environment information has been acquired, after the second access router has acquired the communication environment information. As a result of the configuration, the mobile node can determine a timing at which to transmit the sustain request message.

The present invention provides an access router used in a mobile communication control method for allowing continuous and efficient communication when a mobile node having a plurality of interfaces respectively corresponding to a plurality of different communication networks and performing communication over respective areas of the plurality of different communication networks via the respectively corresponding plurality of interfaces performs communication with a correspondent node via a first access router configuring a subnet of a predetermined communication network among the plurality of different communication networks and, as a result of a subsequent handover by the mobile node, performs communication with the correspondent node via a second access router configuring another subnet of the predetermined communication network. When the access router performs processes as the first access router, the access router receives a sustain request message from the mobile node via any of the plurality of interfaces until the handover by the mobile terminal is completed. The sustain request message stops communication environment information from expiring after an elapse of a predetermined amount of time. The communication environment information is related to an environment of communication performed via the first access router and configured to expire after the elapse of the predetermined amount of time. The access router resets the elapsing predetermined amount of time until expiration when the sustain request message is received. When the access router performs processes as the second access router, the access router receives a communication environment information acquisition message from the mobile node. The communication environment information acquisition message instructs acquisition of the communication environment information held by the first access router. The access router acquires the communication environment information based on the received communication environment information acquisition message. The access router receives the sustain request message from the mobile node via any of the plurality of interfaces. The access router resets the elapsing predetermined amount of time until expiration when the sustain request message is received. The access router establishes a communication environment of a communication by the mobile node performed via the access router itself based on the sustained communication environment information. As a result of the configuration, communication can be continued after the handover, without all protocol states being newly established from the beginning.

In addition, in the access router of the present invention, a preferred aspect of the present invention is that, when the access router performs processes as the first access router, the access router notifies the mobile node that the communication environment information has been acquired, after the second access router has acquired the communication environment information. As a result of the configuration, the mobile node can determine a timing at which to transmit the sustain request message.

In addition, in the access router of the present invention, a preferred aspect of the present invention is that, the sustain request message is periodically received from the mobile node at a time interval shorter than the predetermined amount of time until the communication environment information expires. As a result of the configuration, the communication environment information can be prevented from expiring.

The present invention provides an access router used in a mobile communication control method for allowing continuous and efficient communication when a mobile node having a plurality of interfaces respectively corresponding to a plurality of different communication networks and performing communication over respective areas of the plurality of different communication networks via the respectively corresponding plurality of interfaces performs communication with a correspondence partner via a first access router configuring a subnet of a predetermined communication network among the plurality of different communication networks and, as a result of a subsequent handover by the mobile node, performs communication with the correspondence partner via a second access router configuring another subnet of the predetermined communication network. When the access router performs processes as the second access router, the access router receives a communication environment information acquisition message from the mobile node via a predetermined interface among the plurality of interfaces before communication environment information held by the first access router expires after an elapse of a predetermined amount of time. The first access router holds the communication environment information related to an environment of communication performed via the first access router and configured to expire after an elapse of a predetermined amount of time. The communication environment information acquisition message instructs acquisition of the communication environment information. The access router acquires the communication environment information from the first access router based on the received communication environment information acquisition message, and establishes a communication environment of a communication by the mobile node performed via the access router itself based on the acquired communication environment information. As a result of the configuration, communication can be continued after the handover, without all protocol states being newly established from the beginning.

In addition, in the access router of the present invention, a preferred aspect of the present invention is that a transmission destination of the communication environment information acquisition message received from the mobile node is decided based on prediction information acquired from an access router prediction information providing terminal that provides the prediction information for predicting an access router of a handover destination.

The mobile communication control method, the mobile node, and the access router of the present invention are configured as described above and can allow communication to be continued after the handover without all protocol states being newly established from the beginning.

BEST MODE OF CARRYING OUT THE INVENTION

First Embodiment

Figure 1:
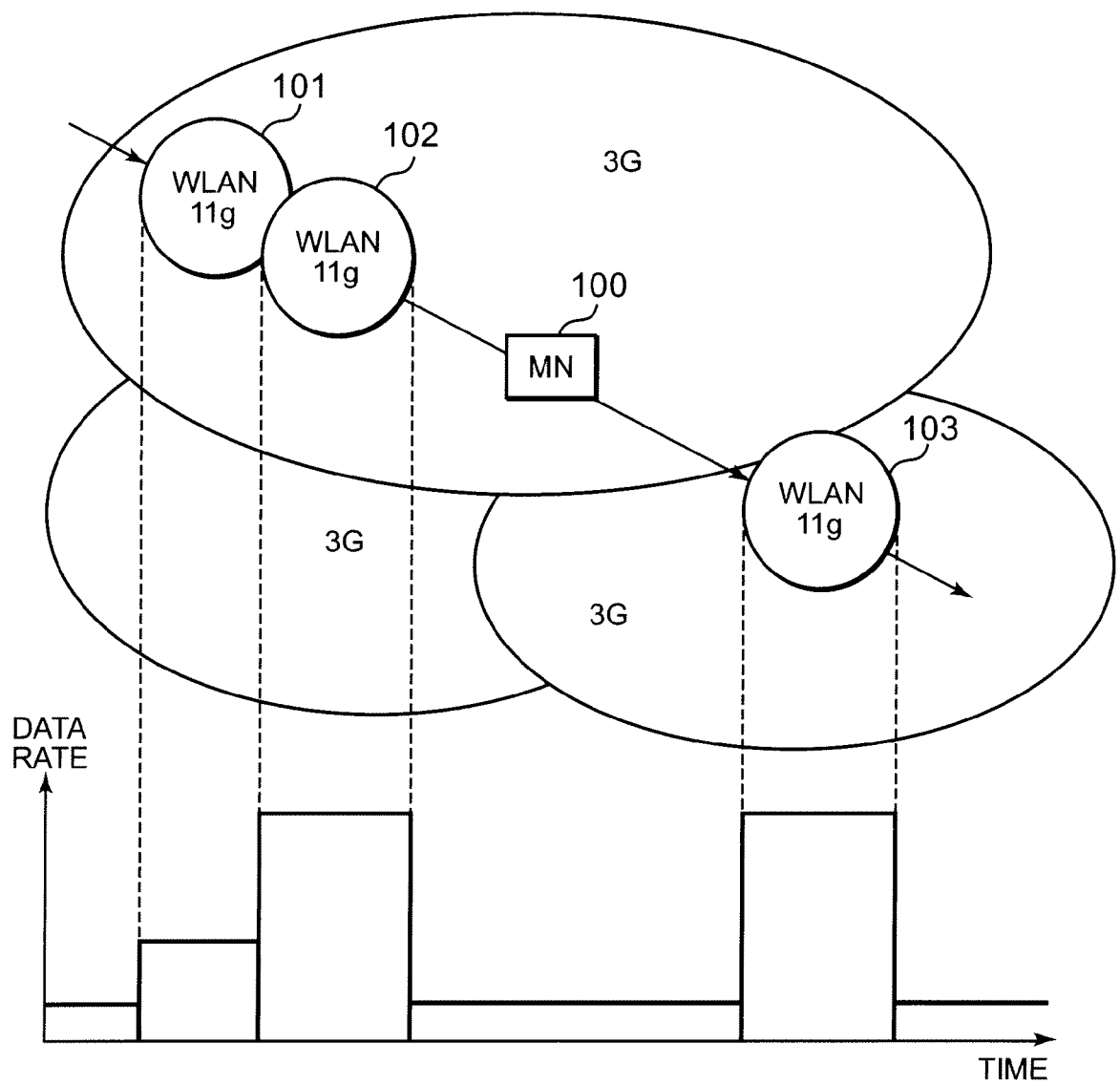
FIG. 1 is a diagram of a communication area over which a mobile node moves according to first to sixth embodiments of the present invention.

A mobile communication control method, a mobile node, and an access router according to a first embodiment of the present invention will be described hereafter, with reference to FIG. 1 to FIG. 4. First, as shown in FIG. 1, a mobile node (MN) 100 communicates with a correspondent node while moving between a plurality of different communication networks. The MN 100 has a plurality of interfaces. The different communication networks are, for example, a 3G cellular network and a WLAN. Two different communication networks are used in the descriptions below. However, the communication networks are not limited to two different communication networks. Many more different communication networks can also be used. As shown in FIG. 1, the MN 100 having two interfaces, one for the 3G and another for the WLAN, communicates while moving over an area configured by the 3G and the WLAN. In this case, the 3G interface is always ON (active). However, the WLAN interface is activated to perform communication at a high data rate when the MN 100 enters WLAN hotspots 101, 102, and 103 (subnets configured by access routers, described hereafter). The WLAN hotspots 101, 102, and 103 are WLAN communication areas.

An example of an operation sequence in the mobile communication method according to the first embodiment of the present invention will be described with reference to FIG. 2. First, the MN 100 is communicating with a predetermined correspondent node via an access router (AR). The AR configures a subnet that is a WLAN hotspot. Here, the AR is a pAR 200. A communication environment (CTD) for when communication is performed is generated and communication is established between the MN 100 and the pAR 200A. Here, the CTD is information, such as the above-described AAA information, information related to QoS, header compression information, and information on IPsec SA and the like among the MN 100, the pAR 200, and the correspondent node (not shown). The CTD is configured to enter a dormant state after an elapse of a predetermined amount of time and to expire after further elapse of a predetermined amount of time.

Here, it is thought that the MN 100 wishes to continue communication with the correspondent node (not shown), via an nAR 201, with minimal interruptions, even after performing a handover, in a manner similar to communication before the handover. The nAR 201 is a handover destination. To achieve this, quick establishment of communication at the handover destination can be considered, using the CTD generated before the handover at the handover destination. However, as described above, the CTD expires after the predetermined amount of time elapses. Therefore, a process to stop expiration is required. The process to stop expiration is particularly effective when the nAR 201 is located far from the pAR 200.

Figure 2:
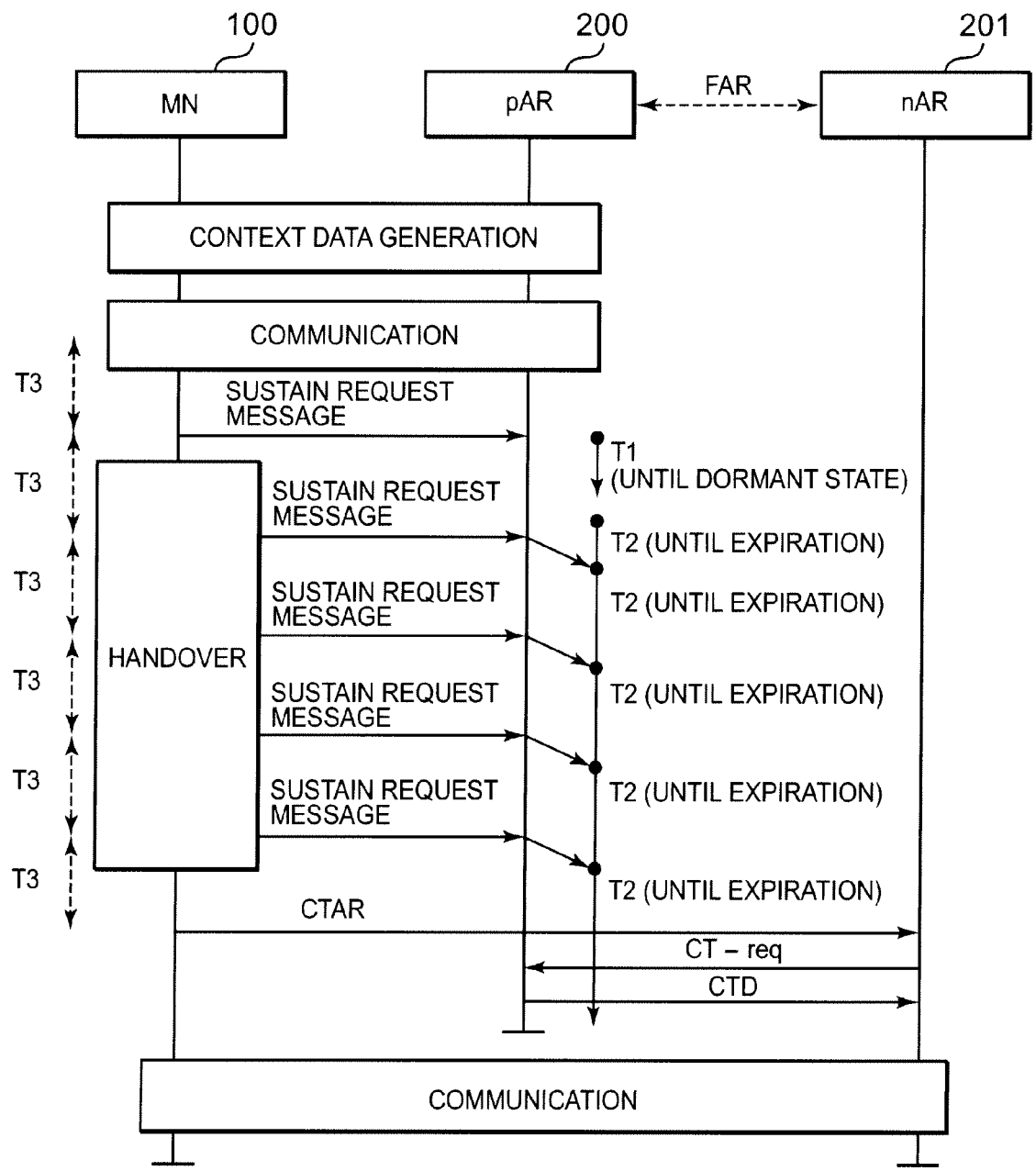
FIG. 2 is a sequence chart used to explain an example of an operation sequence in a mobile communication control method according to a first embodiment of the present invention.

Therefore, as shown in FIG. 2, the MN 100 transmits a sustain request message to the pAR 200. The sustain request message is used to stop the CTD from expiring before the CTD expires. The sustain request message is transmitted via the 3G interface or the WLAN interface. The sustain request message is preferably periodically transmitted at a time interval T3 that is shorter than a time interval T2. The time interval T2 is a time interval until the CTD expires. However, the sustain request message may be lost during transmission. In this case, the CTD may expire. Therefore, a time interval shorter than the time interval T3 is more preferable.

When communication with the pAR 200 starts, the MN 100 periodically transmits the sustain request message to the pAR 200 at the time interval T3. Subsequently, the sustain request message is periodically transmitted until the MN 100 starts the handover and the handover is completed. When the MN 100 completes the handover, the MN 100 transmits a CTAR (equivalent to the above-described communication environment information acquisition message) to the nAR 201. The CTAR instructs the nAR 201 to acquire the CTD from the pAR 200. The nAR 201 that has received the CTAR transmits a CT-req to the pAR 200. The CT-req requests that the pAR 200 transmit the CTD. The nAR 201 acquires the CTD. The nAR 201 then establishes communication by the MN 100 performed via the nAR 201 itself, based on the acquired CTD.

Figure 3:
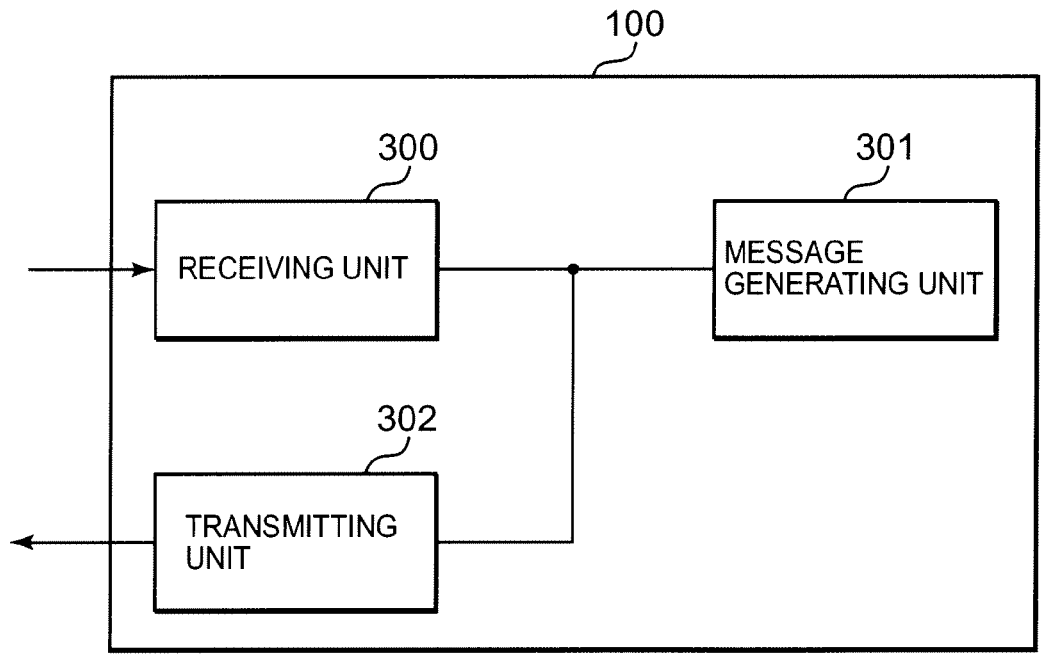
FIG. 3 is a block diagram of an example of a configuration of a mobile node according to the first embodiment of the present invention.

Next, the mobile node (MN) according to the first embodiment of the present invention will be described with reference to FIG. 3. FIG. 3 is a block diagram of an example of a configuration of the MN 100. As shown in FIG. 3, the MN 100 includes a receiving unit 300, a message generating unit 301, and a transmitting unit 302. Constituent elements are not limited to the above. A controlling unit that controls operations performed by the MN 100 itself, a storage unit for information, and the like can also be included. The receiving unit 300, for example, receives information from the correspondent node, receives an electric wave serving as a trigger to start a handover, and the like.

The message generating unit 301 generates the sustain request message transmitted to the pAR 200 holding the CTD and the CTAR instructing acquisition of the CTD. For example, the message generating unit 301 generates the sustain request message at the same time communication is established between the MN 100 and the pAR 200 and generates the CTAR at the same time the MN 100 completes the handover. The transmitting unit 302 transmits the sustain request message generated by the message generating unit 301 to the pAR 200 and transmits the generated CTAR to the nAR 201. For example, when transmitting the sustain request message generated by the message generating unit 301 to the pAR 200, the transmitting unit 302 periodically transmits the sustain request message at a time interval stopping the CTD from expiring.

Figure 4:
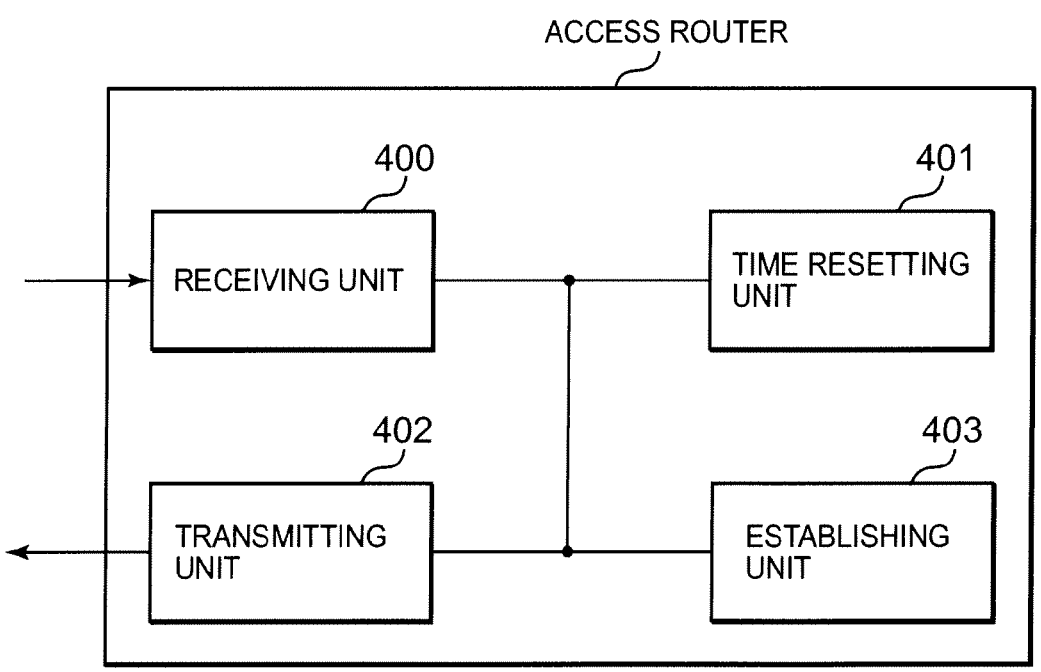
FIG. 4 is a block diagram of an example of a configuration of an access router according to the first embodiment of the present invention.

Next, the access router according to the first embodiment will be described with reference to FIG. 4. FIG. 4 is a block diagram of an example of a configuration of the access router. As shown in FIG. 4, the access router includes a receiving unit 400, a time resetting unit 401, a transmitting unit 402, and an establishing unit 403. Constituent elements are not limited to the above. A controlling unit that controls operations performed by the access router itself, a storage unit for information, and the like can also be included. The receiving unit 400 receives information from the MN 100, the correspondent node of the MN 100 and the like, message requesting acquisition of information from other access routers, and the like. For example, the receiving unit 400 receives the sustain request message from the MN 100 when the access router holds the CTD, receives the CTAR instructing acquisition of the CTD held by another access router from the MN 100, receives the CT-req requesting transmission of the CTD based on the CTAR, and receives the CTD based on the CT-req.

When the access router holds the CTD, the time resetting unit 401, for example, resets (a process for counting, from the beginning, the time passing until the CTD expires) the elapsing predetermined amount of time until the CTD expires, based on the sustain request message transmitted from the MN 100. The transmitting unit 402, for example, transmits the CT-req to the access router holding the CTD based on the CTAR transmitted from the MN 100, and transmits the CTD based on the received CT-req. The establishing unit 403, for example, establishes a new communication by the MN 100 based on the CTD received by the receiving unit 400. The constituent elements are included in all access routers. However, the constituent elements and processes used differ between when the access router operates as the above-described pAR 200 and when the access router operates as the nAR 201.

Second Embodiment

Figure 5:
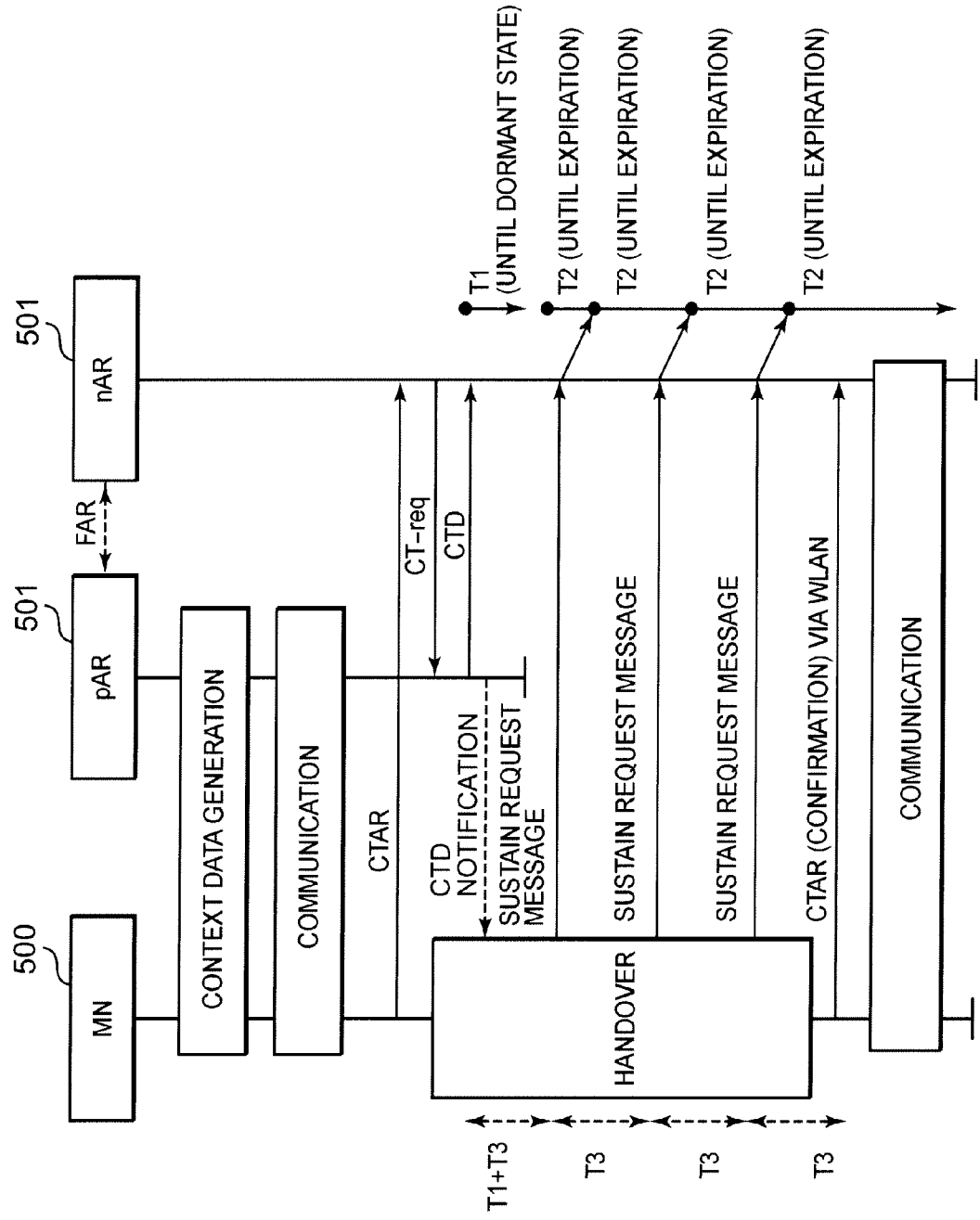
FIG. 5 is a sequence chart used to explain an example of an operation sequence in a mobile communication control method according to a second embodiment of the present invention.

A mobile communication control method, a mobile node, and an access router according to a second embodiment of the present invention will be described with reference to FIG. 3 to FIG. 5. An environment of an area over which an MN according to the second embodiment moves is similar to that according to the first embodiment. Therefore, descriptions thereof will be omitted. First, an example of an operation sequence in the mobile communication control method according to the second embodiment of the present invention will be described with reference to FIG. 5. As shown in FIG. 5, in a same manner as that according to the first embodiment, according to the second embodiment, CTD is generated between an MN 500 and a pAR 501 and communication is established. In a state such as this, the MN 500 transmits a CTAR to an nAR 502. The CTAR instructs the nAR 502 to acquire the CTD held by the pAR 501. The nAR 502 transmits a CT-req to the pAR 501 based on the received CTAR. The CT-req requests that the pAR 501 transmit the CTD. The nAR 502 acquires the CTD.

When a handover is started, the MN 500 transmits a sustain request message to the nAR 502. The sustain request message is used to stop the CTD from expiring before the CTD expires. The sustain request message is transmitted via the 3G interface or the WLAN interface. The sustain request message is preferably periodically transmitted at a time interval T3 that is shorter than a time interval T2. The time interval T2 is a time interval until the CTD expires. However, the sustain request message may be lost during transmission. In this case, the CTD may expire. Therefore, a time interval shorter than the time interval T3 is more preferable.

When, for example, the MN 500 continues transmitting the sustain request message until the handover is completed, and the handover is completed, the MN 500 transmits a CTAR to the nAR 502 via the WLAN interface. The CTAR is used to confirm whether the CTD received by the nAR 502 is authentic. When the nAR 502 receives the CTAR for confirmation and judges that the acquired CTD is authentic, the nAR 502 then establishes communication by the MN 500 performed via the nAR 502 itself, based on the acquired CTD. The pAR 501 can also transmit a CTD notification to the MN 500. The CTD notification is used to inform the MN 500 that the CTD has been transmitted to the nAR 502. From the CTD notification, the MN 500 can determine a timing at which to start transmitting the sustain request message. When the MN 500 determines a transmission destination of the CTAR, the MN 500 can make the determination based on, for example, the above-described CARD information (also referred to, hereinafter, as prediction information).

Next, the mobile node (MN) according to the second embodiment will be described. Constituent elements of the mobile node according to the second embodiment are basically similar to the constituent elements of the mobile node according to the first embodiment. Therefore, the mobile node according to the second embodiment will be described with reference to FIG. 3 that has been used to describe the mobile node according to the first embodiment. Reference numbers used in the description are the same as the reference numbers in FIG. 3.

As shown in FIG. 3, the MN 500 includes the receiving unit 300, the message generating unit 301, and the transmitting unit 302. Constituent elements are not limited to the above. A controlling unit that controls operations performed by the MN 500 itself, a storage unit for information, and the like can also be included. The receiving unit 300, for example, receives information from the correspondent node, receives an electric wave serving as a trigger to start a handover, and receives the CTD notification from the pAR 501.

The message generating unit 301 generates the CTAR instructing the acquisition of the CTD, the sustain request message transmitted to the nAR 502 holding the CTD, the CTAR used to confirm whether the CTD received by the nAR 502 is authentic after the handover by the MN 500 is completed, and the like. For example, the message generating unit 301 generates the CTAR at the same time the communication between the MN 500 and the pAR 501 is established, generates the sustain request message when the handover by the MN 500 starts and the CTD notification is received, and generates the CTAR for confirming whether the CTD is authentic at the same time the handover by the MN 500 is completed. The transmitting unit 302, for example, transmits the CTAR generated by the message generating unit 301 to the nAR 502, transmits the generated sustain request message to the nAR 502 that has acquired the CTD, and transmits the CTAR used to confirm whether the generated CTD is authentic to the nAR 502. When transmitting the sustain request message generated by the message generating unit 301 to the nAR 502, for example, the transmitting unit 302 determines the timing at which to start transmitting the sustain request message based on the received CTD notification and periodically transmits the sustain request message at the time interval that stops the CTD from expiring.

Next, the access router according to the second embodiment of the present invention will be described. Constituent elements of the access router according to the second embodiment are basically similar to the constituent elements of the access router according to the first embodiment. Therefore, the access router according to the second embodiment will be described with reference to FIG. 4 that has been used in the description of the access router according to the first embodiment. Reference numbers used in the description are the same as the reference numbers in FIG. 4.

As shown in FIG. 4, the access router includes the receiving unit 400, the time resetting unit 401, the transmitting unit 402, and the establishing unit 403. Constituent elements are not limited to the above. A controlling unit that controls operations performed by the access router itself, a storage unit for information, and the like can also be included. The receiving unit 400 receives information from the MN 500, the correspondent node of the MN 500 and the like, a message requesting acquisition of information from another access router, and the like. For example, the receiving unit 400 receives the CTAR instructing the acquisition of the CTD held by another access router from the MN 500, receives the CT-req requesting the transmission of the CTD based on the CTAR, receives the CTD based on the CT-req, receives the sustain request message from the MN 500 when the access router acquires the CTD, and receives the CTAR for confirming whether the received CTD is authentic.

When the access router acquires the CTD, the time resetting unit 401, for example, resets (a process for counting, from the beginning, the time passing until the CTD expires) the elapsing predetermined amount of time until the CTD expires, based on the sustain request message transmitted from the MN 500. The transmitting unit 402, for example, transmits the CT-req to the access router holding the CTD based on the CTAR transmitted from the MN 500, transmits the CTD based on the received CT-req, and transmits the CTD notification to the MN 500 when the access router transmits the CTD. The establishing unit 403 establishes a new communication by the MN 500 based on the CTD received by the receiving unit 400. For example, the establishing unit 403 establishes the new communication by the MN 500 based on the received CTD at the same time the receiving unit 400 receives the CTAR for confirming whether the acquired CTD is authentic. The constituent elements are included in all access routers. However, the constituent elements and processes used differ between when the access router operates as the above-described pAR 501 and when the access router operates as the nAR 502.

Third Embodiment

Figure 6:
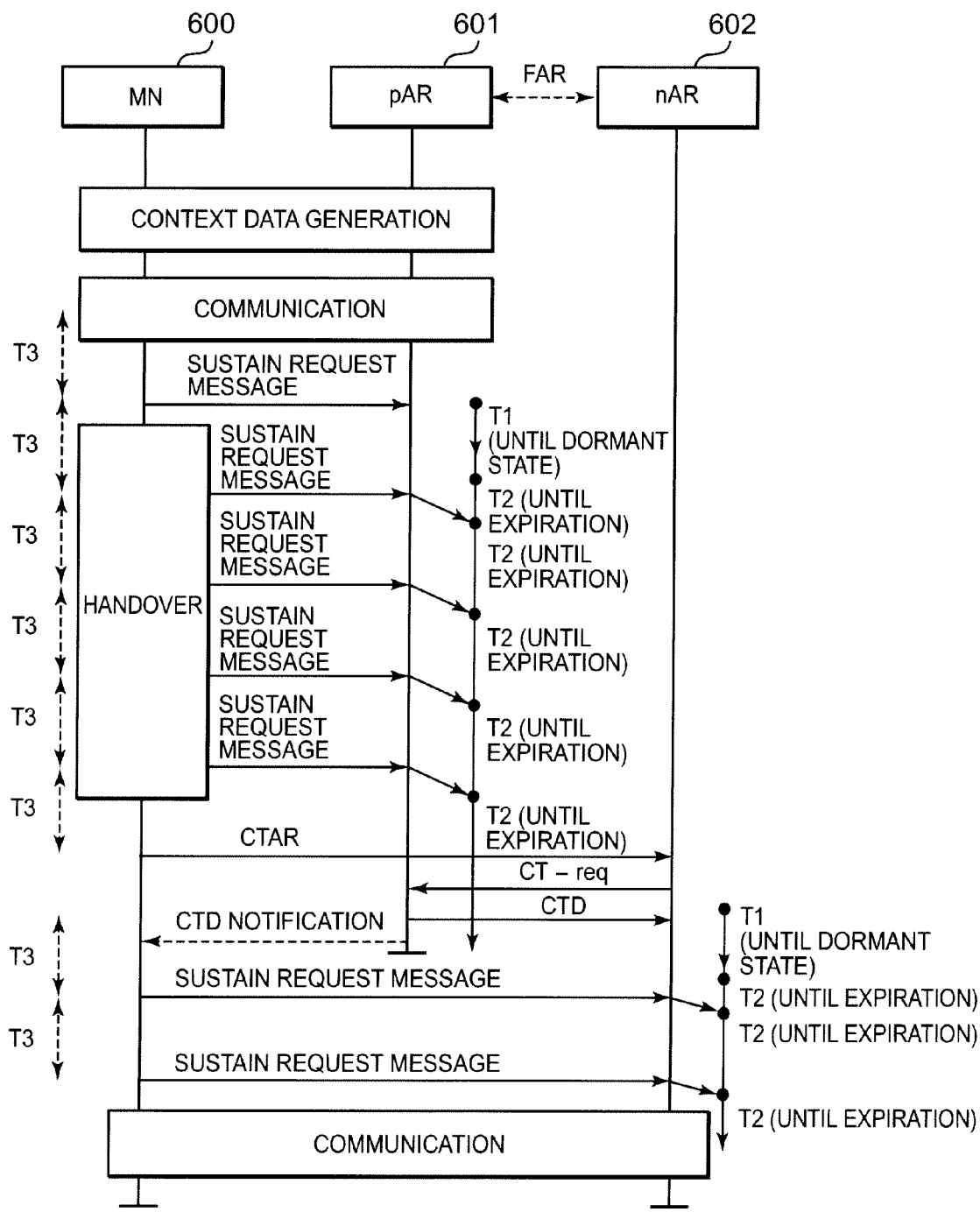
FIG. 6 is a sequence chart used to explain an example of an operation sequence in a mobile communication control method according to a third embodiment of the present invention.

A mobile communication control method, a mobile node, and an access router according to a third embodiment of the present invention will be described with reference to FIG. 3, FIG. 4, and FIG. 6. An environment of an area over which an MN according to the third embodiment moves is similar to that according to the first embodiment. Therefore, descriptions thereof will be omitted. First, an example of an operation sequence in the mobile communication control method according to the third embodiment of the present invention will be described with reference to FIG. 6. As shown in FIG. 6, in a same manner as that according to the first embodiment, according to the third embodiment, CTD is generated between an MN 600 and a pAR 601 and communication is established.

In a state such as this, when the communication with the pAR 601 starts, the MN 600 starts periodically transmitting the sustain request message to the pAR 601 at the time interval T3. Subsequently, the sustain request message is periodically transmitted until the MN 600 starts a handover and the handover is completed. The sustain request message is transmitted via the 3G interface or the WLAN interface. The sustain request message is preferably periodically transmitted at the time interval T3 that is shorter than the time interval T2. The time interval T2 is a time interval until the CTD expires. However, the sustain request message may be lost during transmission. In this case, the CTD may expire. Therefore, a time interval shorter than the time interval T3 is more preferable.

When the MN 600 completes the handover, the MN 600 transmits a CTAR to an nAR 602. The CTAR instructs the acquisition of the CTD from the pAR 601. The nAR 602 that has received the CTAR transmits a CT-req to the pAR 601. The CT-req requests that the pAR 601 transmit the CTD. The nAR 602 acquires the CTD. Then, to prevent expiration of the CTD that has been transferred to the nAR 602, the MN 600 transmits the sustain request message to the nAR 602. While the nAR 602 is receiving the sustain request message from the MN 600, the nAR 602 establishes the communication by the MN 600 performed via the nAR 602 itself, based on the acquired CTD. The pAR 601 can transmit a CTD notification to the MN 600. The CTD notification is used to inform the MN 600 that the CTD has been transmitted to the nAR 602. From the CTD notification, the MN 600 can determine a timing at which to start transmitting the sustain request message. As a result, after the CTD is transferred to the nAR 602, the CTD does not expire at the nAR 602 even when time is required to establish new communication with the MN 600.

Next, the mobile node (MN) according to the third embodiment will be described. Constituent elements of the mobile node according to the third embodiment are basically similar to the constituent elements of the mobile node according to the first embodiment. Therefore, the mobile node according to the third embodiment will be described with reference to FIG. 3 that has been used to describe the mobile node according to the first embodiment. Reference numbers used in the description are the same as the reference numbers in FIG. 3.

As shown in FIG. 3, the MN 600 includes the receiving unit 300, the message generating unit 301, and the transmitting unit 302. Constituent elements are not limited to the above. A controlling unit that controls operations performed by the MN 600 itself, a storage unit for information, and the like can also be included. The receiving unit 300, for example, receives information from the correspondence partner, receives an electric wave serving as a trigger to start a handover, and receives the CTD notification from the pAR 601.

The message generating unit 301 generates the sustain request message transmitted to the pAR 601 and the nAR 602 holding the CTD, the CTAR instructing the acquisition of the CTD, and the like. For example, the message generating unit 301 generates the sustain request message at the same time the communication between the MN 600 and the pAR 601 is established, generates the CTAR at the same time the handover by the MN 600 is completed, and generates the sustain request message at the same time the CTD notification is received. The transmitting unit 302, for example, transmits the sustain request message generated by the message generating unit 301 to the pAR 601 and the nAR 602, and transmits the generated CTAR to the nAR 602. When transmitting the sustain request message generated by the message generating unit 301 to the nAR 602, for example, the transmitting unit 302 determines the timing at which to start transmitting the sustain request message based on the received CTD notification and periodically transmits the sustain request message at the time interval that stops the CTD from expiring.

Next, the access router according to the third embodiment of the present invention will be described. Constituent elements of the access router according to the third embodiment are basically similar to the constituent elements of the access router according to the first embodiment. Therefore, the access router according to the third embodiment will be described with reference to FIG. 4 that has been used in the description of the access router according to the first embodiment. Reference numbers used in the description are the same as the reference numbers in FIG. 4.

As shown in FIG. 4, the access router includes the receiving unit 400, the time resetting unit 401, the transmitting unit 402, and the establishing unit 403. Constituent elements are not limited to the above. A controlling unit that controls operations performed by the access router itself, a storage unit for information, and the like can also be included. The receiving unit 400 receives information from the MN 600, the correspondence partner of the MN 600 and the like, a message requesting acquisition of information from another access router, and the like. For example, the receiving unit 400 receives the sustain request message from the MN 600 when the access router holds the CTD, receives the CTAR instructing the acquisition of the CTD held by another access router from the MN 600, receives the CT-req requesting the transmission of the CTD based on the CTAR, receives the CTD based on the CT-req, and receives the sustain request message from the MN 600 when the access router acquires the CTD.

When the access router holds or acquires the CTD, the time resetting unit 401, for example, resets (a process for counting, from the beginning, the time passing until the CTD expires) the elapsing predetermined amount of time until the CTD expires, based on the sustain request message transmitted from the MN 600. The transmitting unit 402, for example, transmits the CT-req to the access router holding the CTD based on the CTAR transmitted from the MN 600, transmits the CTD based on the received CT-req, and transmits the CTD notification to the MN 600 when the access router transmits the CTD. The establishing unit 403, for example, establishes a new communication by the MN 600 based on the CTD received by the receiving unit 400. The constituent elements are included in all access routers. However, the constituent elements and processes used differ between when the access router operates as the above-described pAR 601 and when the access router operates as the nAR 602.

Fourth Embodiment

Figure 7:
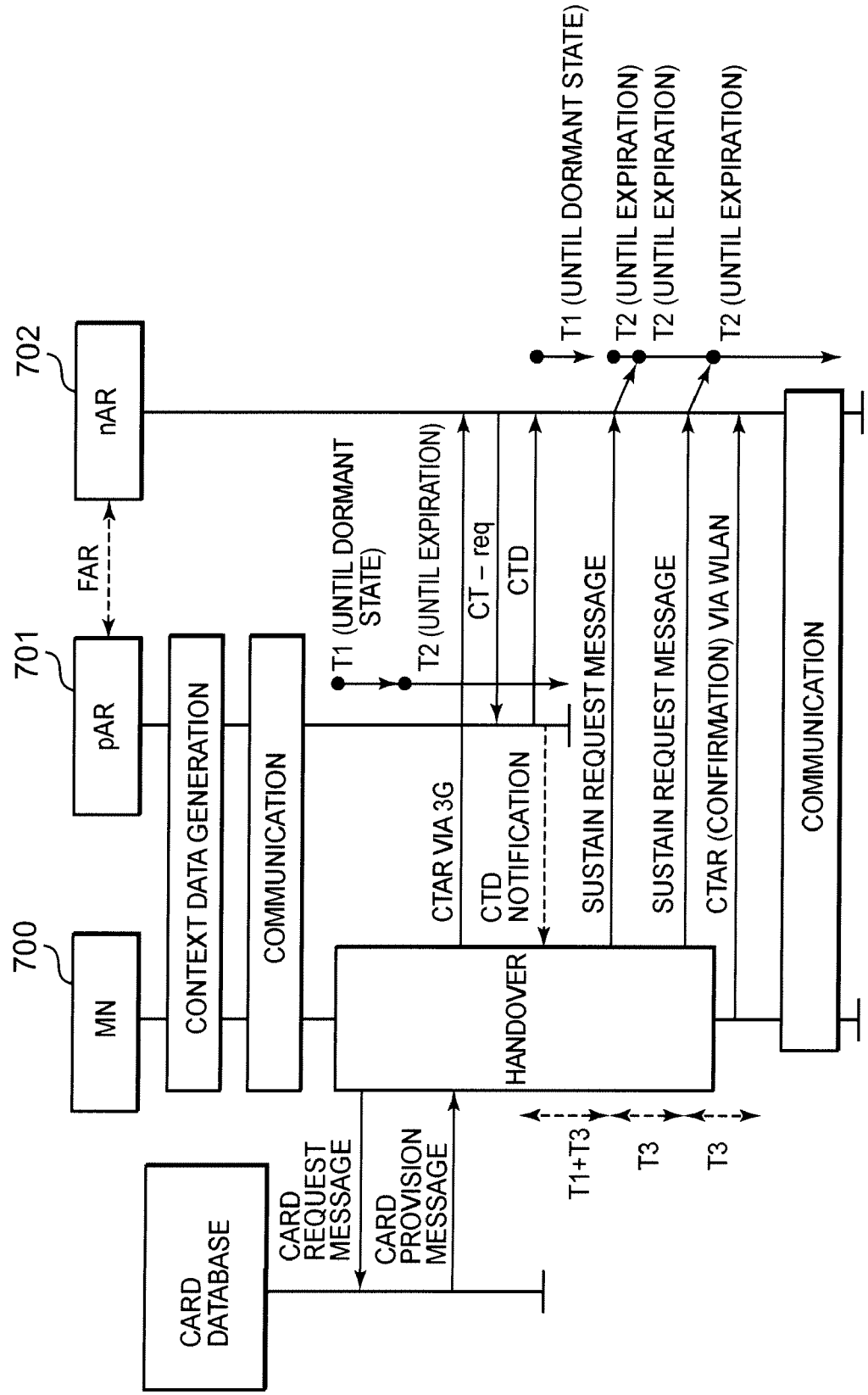
FIG. 7 is a sequence chart used to explain an example of an operation sequence in a mobile communication control method according to a fourth embodiment of the present invention.

A mobile communication control method, a mobile node, and an access router according to a fourth embodiment of the present invention will be described with reference to FIG. 3, FIG. 4, and FIG. 7. An environment of an area over which an MN according to the fourth embodiment moves is similar to that according to the first embodiment. Therefore, descriptions thereof will be omitted. First, an example of an operation sequence in the mobile communication control method according to the fourth embodiment of the present invention will be described with reference to FIG. 7. As shown in FIG. 7, in a same manner as that according to the first embodiment, according to the fourth embodiment, CTD is generated between an MN 700 and a pAR 701 and communication is established.

In a state such as this, when a handover is started after the communication with the pAR 701 starts, the MN 700 transmits a CARD request message requesting acquisition of prediction information to a CARD database (equivalent to the above-described access router prediction information providing terminal) to determine where to transmit a CTAR instructing the access router of a next handover destination to acquire the CTD held by the pAR 701. The CARD database provides the prediction information used to predict an access router of a handover destination. The MN 700 that has received a CARD provision message including relevant prediction information transmitted based on the CARD request message then determines a transmission destination of the CTAR based on the prediction information included in the CARD provision message. The MN 700 transmits the CTAR to an nAR 702 that is the determined access router, via the 3G interface.

The nAR 702 that has received the CTAR transmits a CT-req to the pAR 701. The CT-req requests that the pAR 701 transmit the CTD. The nAR 702 acquires the CTD. The MN 700 periodically transmits a sustain request message to the nAR 702 that has received the CTD at the time interval T3. The sustain request message is used to stop the CTD from expiring. Subsequently, the sustain request message is periodically transmitted until the handover by the MN 700 is completed. The sustain request message is transmitted via the 3G interface or the WLAN interface. The sustain request message is preferably periodically transmitted at the time interval T3 that is shorter than the time interval T2. The time interval T2 is a time interval until the CTD expires. However, the sustain request message may be lost during transmission. In this case, the CTD may expire. Therefore, a time interval shorter than the time interval T3 is more preferable.

When, for example, the MN 700 continues transmitting the sustain request message until the handover is completed, and the handover is completed, the MN 700 transmits a CTAR to the nAR 702 via the WLAN interface. The CTAR is used to confirm whether the CTD received by the nAR 702 is authentic. When the nAR 702 receives the CTAR for confirmation and judges that the acquired CTD is authentic, the nAR 702 then establishes communication by the MN 700 performed via the nAR 702 itself, based on the acquired CTD. The pAR 701 can also transmit a CTD notification to the MN 700. The CTD notification is used to inform the MN 700 that the CTD has been transmitted to the nAR 702. From the CTD notification, the MN 700 can determine a timing at which to start transmitting the sustain request message.

Next, the mobile node (MN) according to the fourth embodiment will be described. Constituent elements of the mobile node according to the fourth embodiment are basically similar to the constituent elements of the mobile node according to the first embodiment. Therefore, the mobile node according to the fourth embodiment will be described with reference to FIG. 3 that has been used to describe the mobile node according to the first embodiment. Reference numbers used in the description are the same as the reference numbers in FIG. 3.

As shown in FIG. 3, the MN 700 includes the receiving unit 300, the message generating unit 301, and the transmitting unit 302. Constituent elements are not limited to the above. A controlling unit that controls operations performed by the MN 700 itself, a storage unit for information, and the like can also be included. The receiving unit 300, for example, receives information from the correspondent node, receives an electric wave serving as a trigger to start a handover, receives the CARD provision message including the prediction information from the CARD database, and receives the CTD notification from the pAR 601.

The message generating unit 301, for example, generates the CARD request message at the same time the communication is established between the MN 700 and the pAR 701 and the handover is started, generates the CTAR for performing transmission to the nAR 702 determined to be the transmission destination based on the prediction information at the same time the CARD provision message is received, generates the sustain request message when the CTD notification is received from the pAR 701, and generates the CTAR used to confirm whether the CTD received by the nAR 702 is authentic and the like. The transmitting unit 302, for example, transmits the CARD request message generated by the message generating unit 301 to the CARD database, and transmits the generated CTAR, the sustain request message, and the CTAR for confirming whether the received CTD is authentic to the nAR 702. When transmitting the sustain request message generated by the message generating unit 301 to the nAR 702, for example, the transmitting unit 302 determines the timing at which to start transmitting the sustain request message based on the received CTD notification and periodically transmits the sustain request message at the time interval that stops the CTD from expiring.

Next, the access router according to the fourth embodiment of the present invention will be described. Constituent elements of the access router according to the fourth embodiment are basically similar to the constituent elements of the access router according to the first embodiment. Therefore, the access router according to the fourth embodiment will be described with reference to FIG. 4 that has been used in the description of the access router according to the first embodiment. Reference numbers used in the description are the same as the reference numbers in FIG. 4.

As shown in FIG. 4, the access router includes the receiving unit 400, the time resetting unit 401, the transmitting unit 402, and the establishing unit 403. Constituent elements are not limited to the above. A controlling unit that controls operations performed by the access router itself, a storage unit for information, and the like can also be included. The receiving unit 400 receives information from the MN 700, the correspondent node of the MN 700 and the like, a message requesting acquisition of information from another access router, and the like. For example, the receiving unit 400 receives the CTAR instructing the acquisition of the CTD held by another access router from the MN 700, receives the CT-req requesting the transmission of the CTD based on the CTAR, receives the CTD based on the CT-req, receives the sustain request message from the MN 700 when the access router acquires the CTD, and receives the CTAR for confirming whether the received CTD is authentic.

When the access router acquires the CTD, the time resetting unit 401, for example, resets (a process for counting, from the beginning, the time passing until the CTD expires) the elapsing predetermined amount of time until the CTD expires, based on the sustain request message transmitted from the MN 700. The transmitting unit 402, for example, transmits the CT-req to the access router holding the CTD based on the CTAR transmitted from the MN 700, transmits the CTD based on the received CT-req, and transmits the CTD notification to the MN 700 when the access router transmits the CTD. The establishing unit 403, for example, establishes a new communication by the MN 700 based on the received CTD at the same time the receiving unit 400 receives the CTAR for confirming whether the acquired CTD is authentic. The constituent elements are included in all access routers. However, the constituent elements and processes used differ between when the access router operates as the above-described pAR 701 and when the access router operates as the nAR 702.

Fifth Embodiment

Figure 8:
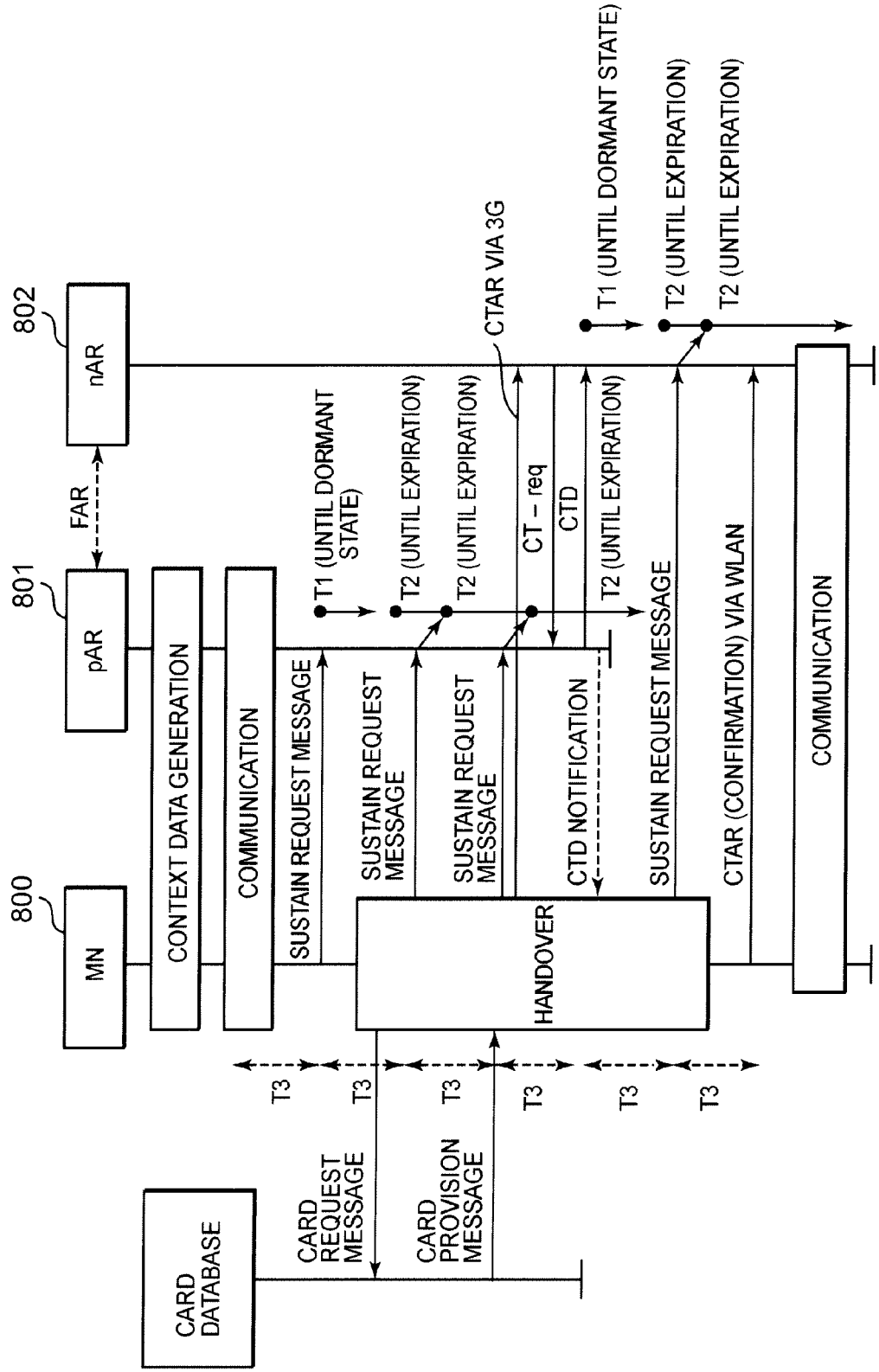
FIG. 8 is a sequence chart used to explain an example of an operation sequence in a mobile communication control method according to a fifth embodiment of the present invention.

A mobile communication control method, a mobile node, and an access router according to a fifth embodiment of the present invention will be described with reference to FIG. 3, FIG. 4, and FIG. 8. An environment of an area over which an MN according to the fifth embodiment moves is similar to that according to the first embodiment. Therefore, descriptions thereof will be omitted. First, an example of an operation sequence in the mobile communication control method according to the fifth embodiment of the present invention will be described with reference to FIG. 8. As shown in FIG. 8, in a same manner as that according to the first embodiment, according to the fifth embodiment, CTD is generated between an MN 800 and a pAR 801 and communication is established.

In a state such as this, when the communication with the pAR 801 starts, the MN 6800 starts periodically transmitting the sustain request message to the pAR 801 at the time interval T3. Then, when the handover starts, the MN 800 transmits the CARD request message requesting acquisition of prediction information to the CARD database to determine where to transmit a CTAR instructing the access router of a next handover destination to acquire the CTD held by the pAR 801. The CARD database provides the prediction information used to predict an access router of a handover destination. The MN 800 that has received a CARD provision message including relevant prediction information transmitted based on the CARD request message then determines a transmission destination of the CTAR based on the prediction information included in the CARD provision message. The MN 800 transmits the CTAR to the nAR 802 that is the determined access router, via the 3G interface.

An nAR 802 that has received the CTAR transmits a CT-req to the pAR 801. The CT-req requests that the pAR 801 transmit the CTD. The nAR 802 acquires the CTD. The MN 800 periodically transmits a sustain request message to the nAR 802 that has received the CTD at the time interval T3. The sustain request message is used to stop the CTD from expiring. Subsequently, the sustain request message is periodically transmitted until the handover by the MN 800 is completed. In the example in FIG. 8, the sustain request message is transmitted to the nAR 802 in a state in which the handover is not completed. However, the handover can be completed. The sustain request message is transmitted via the 3G interface or the WLAN interface. The sustain request message is preferably periodically transmitted at the time interval T3 that is shorter than the time interval T2. The time interval T2 is a time interval until the CTD expires. However, the sustain request message may be lost during transmission. In this case, the CTD may expire. Therefore, a time interval shorter than the time interval T3 is more preferable.

When the MN 800 completes the handover, the MN 800 transmits a CTAR to the nAR 802 via the WLAN interface. The CTAR is used to confirm whether the CTD received by the nAR 802 is authentic. When the nAR 802 receives the CTAR for confirmation and judges that the acquired CTD is authentic, the nAR 802 then establishes communication by the MN 800 performed via the nAR 802 itself, based on the acquired CTD. The pAR 801 can also transmit a CTD notification to the MN 800. The CTD notification is used to inform the MN 800 that the CTD has been transmitted to the nAR 802. From the CTD notification, the MN 800 can determine a timing at which to start transmitting the sustain request message. As a result, after the CTD is transferred to the nAR 802, the CTD does not expire at the nAR 802 even when time is required to establish new communication with the MN 800.

Next, the mobile node (MN) according to the fifth embodiment will be described. Constituent elements of the mobile node according to the fifth embodiment are basically similar to the constituent elements of the mobile node according to the first embodiment. Therefore, the mobile node according to the fifth embodiment will be described with reference to FIG. 3 that has been used to describe the mobile node according to the first embodiment. Reference numbers used in the description are the same as the reference numbers in FIG. 3.

As shown in FIG. 3, the MN 800 includes the receiving unit 300, the message generating unit 301, and the transmitting unit 302. Constituent elements are not limited to the above. A controlling unit that controls operations performed by the MN 800 itself, a storage unit for information, and the like can also be included. The receiving unit 300, for example, receives information from the correspondent node, receives an electric wave serving as a trigger to start a handover, receives the CARD provision message including the prediction information from the CARD database, and receives the CTD notification from the pAR 801.

The message generating unit 301 generates the CARD request message at the same time the communication is established between the MN 800 and the pAR 801 and the handover is started, generates the CTAR for performing transmission to the nAR 802 determined to be the transmission destination based on the prediction information at the same time the CARD provision message is received, generates the sustain request message for the pAR 801 holding the CTD, generates the sustain request message for the nAR 801 when the CTD notification is received from the pAR 801, and generates the CTAR used to confirm whether the CTD received by the nAR 802 is authentic.

The transmitting unit 302, for example, transmits the CARD request message generated by the message generating unit 301 to the CARD database, and transmits the generated CTAR, the sustain request message, and the CTAR for confirming whether the received CTD is authentic to the pAR 801 and the nAR 802. When transmitting the sustain request message generated by the message generating unit 301 to the nAR 802, for example, the transmitting unit 302 determines the timing at which to start transmitting the sustain request message based on the received CTD notification and periodically transmits the sustain request message at the time interval that stops the CTD from expiring.

Next, the access router according to the fifth embodiment of the present invention will be described. Constituent elements of the access router according to the fifth embodiment are basically similar to the constituent elements of the access router according to the first embodiment. Therefore, the access router according to the fifth embodiment will be described with reference to FIG. 4 that has been used in the description of the access router according to the first embodiment. Reference numbers used in the description are the same as the reference numbers in FIG. 4.

As shown in FIG. 4, the access router includes the receiving unit 400, the time resetting unit 401, the transmitting unit 402, and the establishing unit 403. Constituent elements are not limited to the above. A controlling unit that controls operations performed by the access router itself, a storage unit for information, and the like can also be included. The receiving unit 400 receives information from the MN 800, the correspondent node of the MN 800 and the like, a message requesting acquisition of information from another access router, and the like. For example, the receiving unit 400 receives the sustain request message from the MN 800 when the access router holds the CTD, receives the CTAR instructing the acquisition of the CTD held by another access router from the MN 800, receives the CT-req requesting the transmission of the CTD based on the CTAR, receives the CTD based on the CT-req, receives the sustain request message from the MN 800 when the access router acquires the CTD, and receives the CTAR for confirming whether the received CTD is authentic.

When the access router holds or acquires the CTD, the time resetting unit 401, for example, resets (a process for counting, from the beginning, the time passing until the CTD expires) the elapsing predetermined amount of time until the CTD expires, based on the sustain request message transmitted from the MN 800. The transmitting unit 402, for example, transmits the CT-req to the access router holding the CTD based on the CTAR transmitted from the MN 800, transmits the CTD based on the received CT-req, and transmits the CTD notification to the MN 800 when the access router transmits the CTD. The establishing unit 403, for example, establishes a new communication by the MN 800 based on the received CTD at the same time the receiving unit 400 receives the CTAR for confirming whether the acquired CTD is authentic. The constituent elements are included in all access routers. However, the constituent elements and processes used differ between when the access router operates as the above-described pAR 801 and when the access router operates as the nAR 802.

Sixth Embodiment

Figure 9:
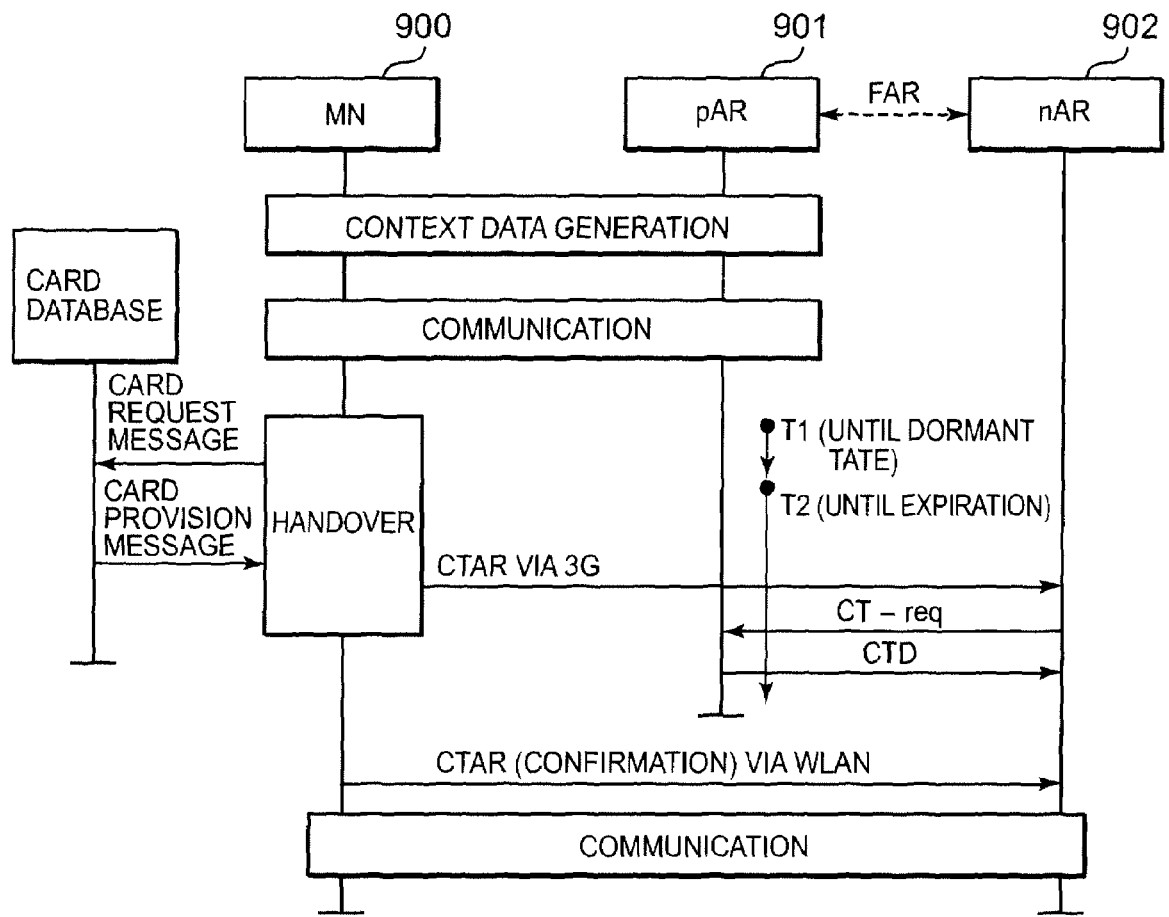
FIG. 9 is a sequence chart used to explain an example of an operation sequence in a mobile communication control method according to a sixth embodiment of the present invention.

A mobile communication control method, a mobile node, and an access router according to a sixth embodiment of the present invention will be described with reference to FIG. 3, FIG. 9, FIG. 10, and FIG. 11. An environment of an area over which an MN according to the sixth embodiment moves is similar to that according to the first embodiment. Therefore, descriptions thereof will be omitted. First, an example of an operation sequence in the mobile communication control method according to the sixth embodiment of the present invention will be described with reference to FIG. 9. As shown in FIG. 9, in a same manner as that according to the first embodiment, according to the sixth embodiment, CTD is generated between an MN 900 and a pAR 901 and communication is established.

In a state such as this, when the communication with the pAR 901 starts, the MN 900 transmits the CARD request message requesting acquisition of prediction information to the CARD database described according to the fourth and fifth embodiments to determine where to transmit a CTAR instructing an access router of a next handover destination to acquire the CTD held by the pAR 901. The CARD database provides the prediction information used to predict the access router of the handover destination. The MN 900 that has received a CARD provision message including relevant prediction information transmitted based on the CARD request message then determines a transmission destination of the CTAR based on the prediction information included in the CARD provision message. The MN 900 transmits the CTAR to an nAR 902 that is the determined access router, via the 3G interface.

The nAR 902 that has received the CTAR transmits a CT-req to the pAR 901. The CT-req requests that the pAR 901 transmit the CTD. The nAR 902 acquires the CTD. The MN 900 transmits a CTAR to the nAR 902 via the WLAN interface, before the CTD expires. The CTAR is used to confirm whether the CTD received by the nAR 902 is authentic. When the nAR 902 receives the CTAR for confirmation and judges that the acquired CTD is authentic, the nAR 902 then establishes communication by the MN 900 performed via the nAR 902 itself, based on the acquired CTD. As a result, the communication performed via the nAR 902 is established before the CTD expires. Therefore, the sustain request message described according to the first to fifth embodiments is not required to be transmitted.

Next, the mobile node (MN) according to the sixth embodiment will be described. Constituent elements of the mobile node according to the sixth embodiment are basically similar to the constituent elements of the mobile node according to the first embodiment. Therefore, the mobile node according to the sixth embodiment will be described with reference to FIG. 3 that has been used to describe the mobile node according to the first embodiment. Reference numbers used in the description are the same as the reference numbers in FIG. 3.

As shown in FIG. 3, the MN 900 includes the receiving unit 300, the message generating unit 301, and the transmitting unit 302. Constituent elements are not limited to the above. A controlling unit that controls operations performed by the MN 900 itself, a storage unit for information, and the like can also be included. The receiving unit 300, for example, receives information from the correspondent node, receives an electric wave serving as a trigger to start a handover, and receives the CARD provision message including the prediction information from the CARD database.

The message generating unit 301 generates the CARD request message at the same time the communication is established between the MN 900 and the pAR 901 and the handover is started, generates the CTAR for performing transmission to the nAR 902 determined to be the transmission destination based on the prediction information at the same time the CARD provision message is received, and generates the CTAR used to confirm whether the CTD received by the nAR 902 is authentic. The transmitting unit 302, for example, transmits the CARD request message generated by the message generating unit 301 to the CARD database, and transmits the generated CTAR and the CTAR for confirming whether the received CTD is authentic to the nAR 902.

Figure 10:
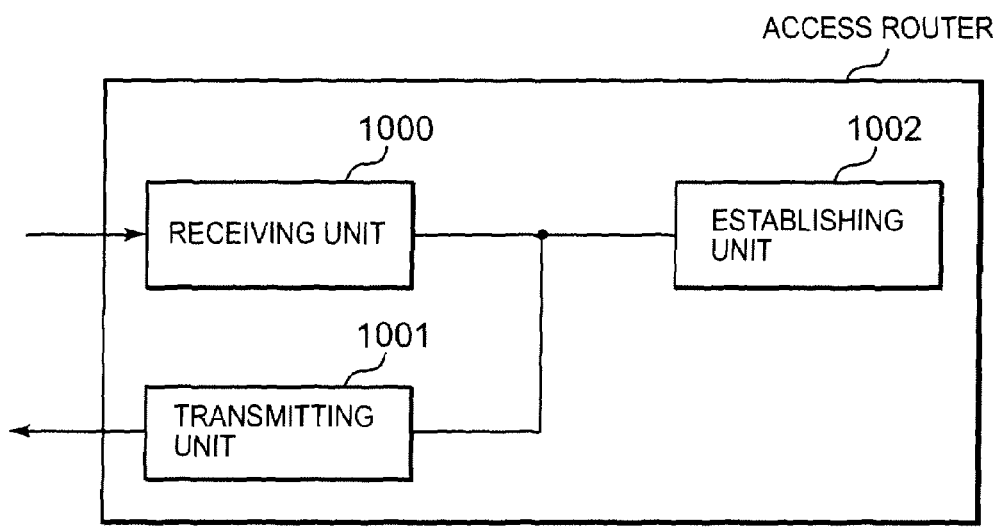
FIG. 10 is a block diagram of an example of a configuration of an access router according to the sixth embodiment of the present invention.

Next, the access router according to the sixth embodiment of the present invention will be described with reference to FIG. 10. As shown in FIG. 10, the access router includes a receiving unit 1000, a transmitting unit 1001, and an establishing unit 1002. Constituent elements are not limited to the above. A controlling unit that controls operations performed by the access router itself, a storage unit for information, and the like can also be included. The receiving unit 1000 receives information from the MN 900, the correspondent node of the MN 900 and the like, a message requesting acquisition of information from another access router, and the like. For example, the receiving unit 1000 receives the CTAR instructing the acquisition of the CTD held by another access router from the MN 900, receives the CT-req requesting the transmission of the CTD based on the CTAR, receives the CTD based on the CT-req, and receives the CTAR for confirming whether the received CTD is authentic.

The transmitting unit 1001, for example, transmits the CT-req to the access router holding the CTD based on the CTAR transmitted from the MN 900 and transmits the CTD based on the received CT-req. The establishing unit 1002, for example, establishes a new communication by the MN 900 based on the received CTD at the same time the receiving unit 1000 receives the CTAR for confirming whether the acquired CTD is authentic. The constituent elements are included in all access routers. However, the constituent elements and processes used differ between when the access router operates as the above-described pAR 901 and when the access router operates as the nAR 902.

Figure 11:
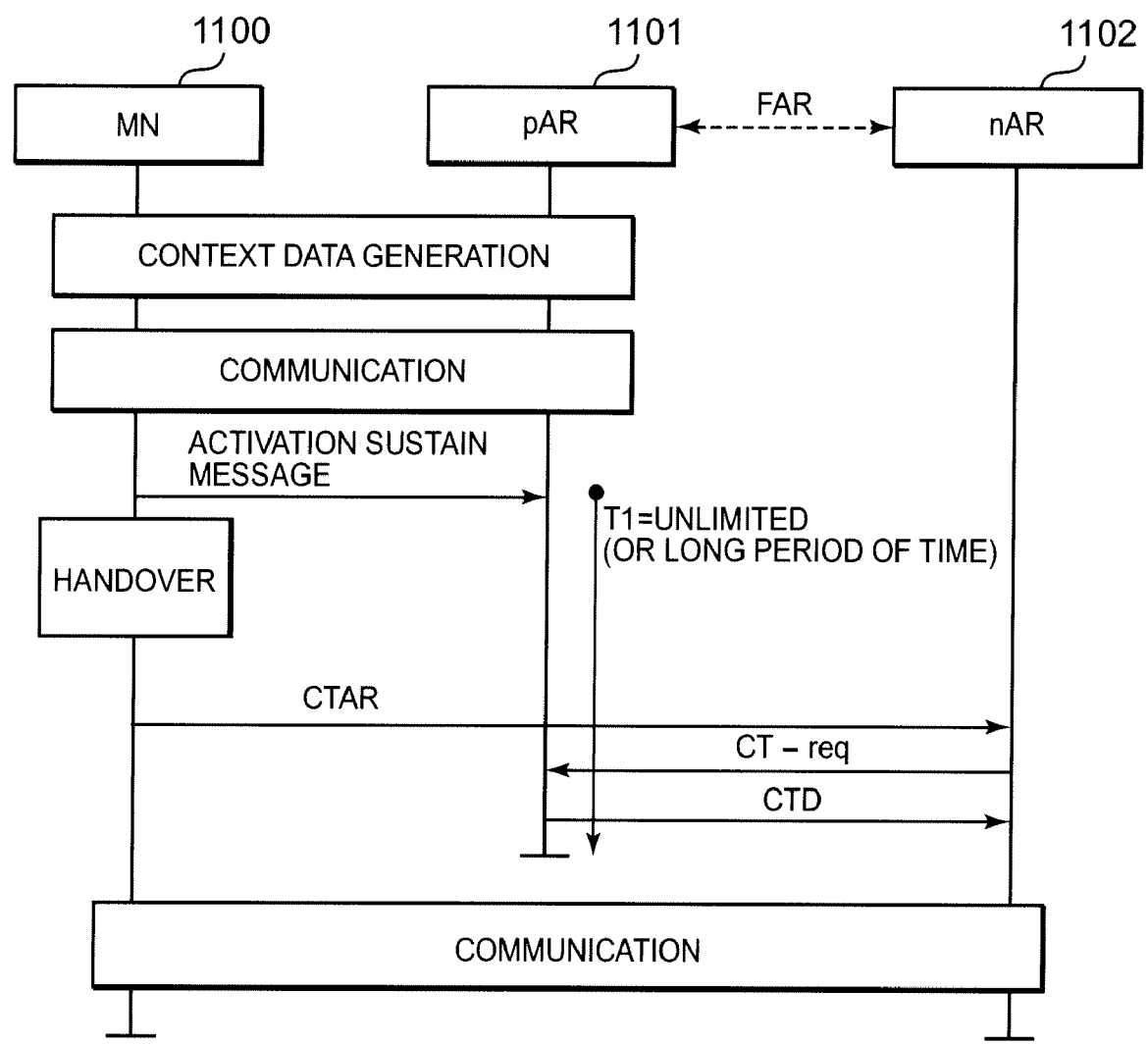
FIG. 11 is a sequence chart used to explain an example of an operation sequence in a method other than the mobile communication control method according to the first to sixth embodiments.
Figure 12:
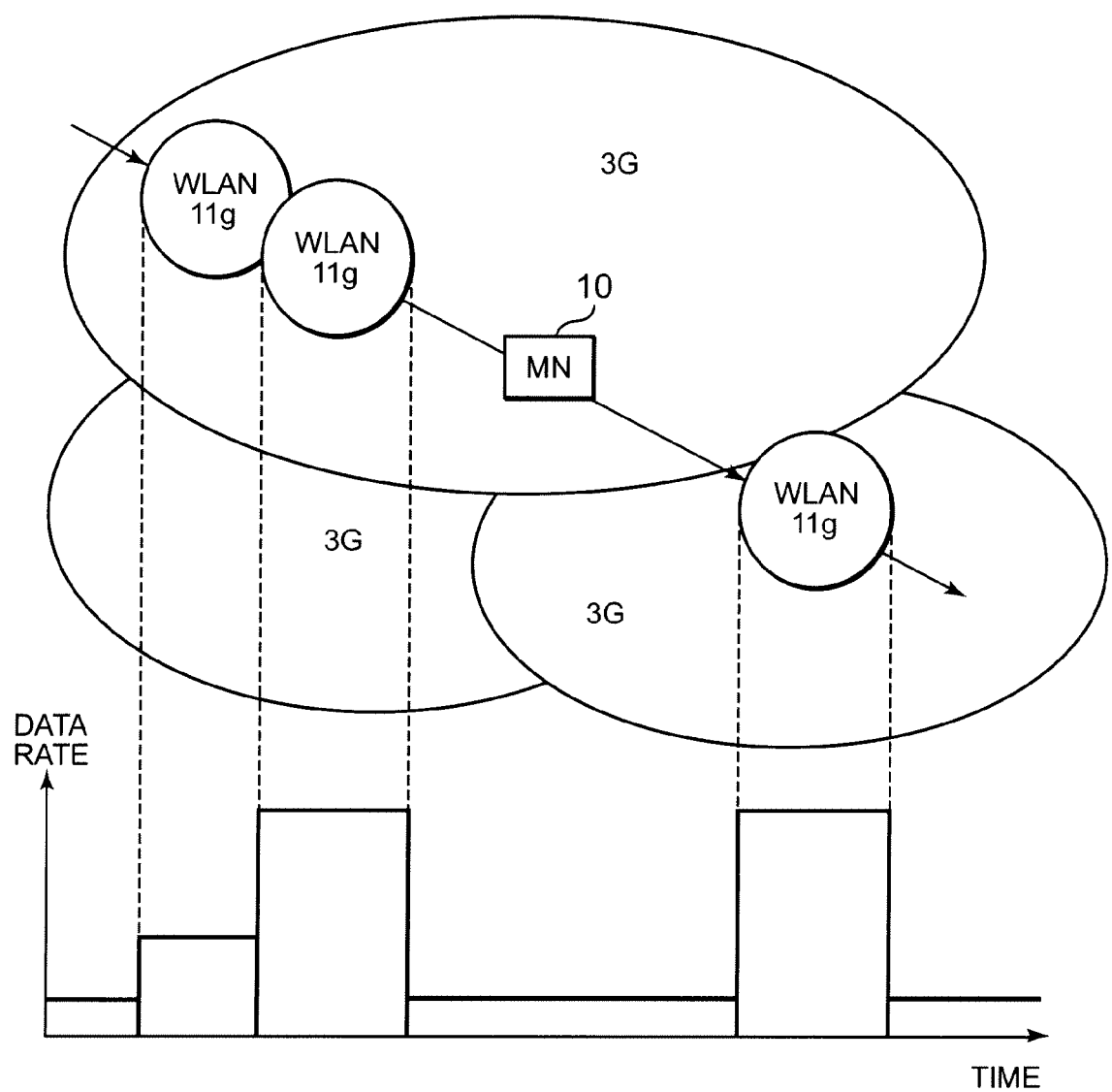
FIG. 12 is a diagram of a communication area over which a conventional mobile node moves.
Figure 13:
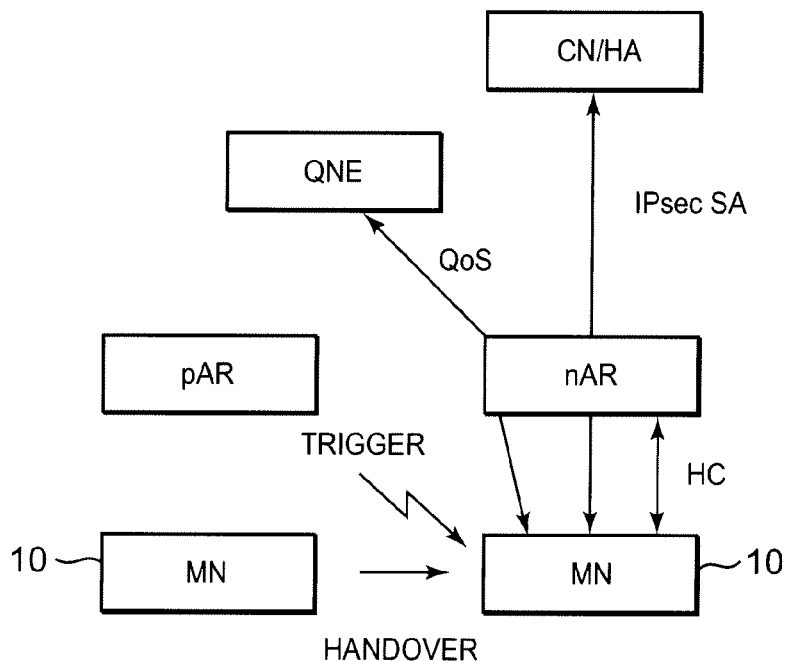
FIG. 13 is a diagram used to explain a handover performed by the conventional mobile node.
Figure 14:
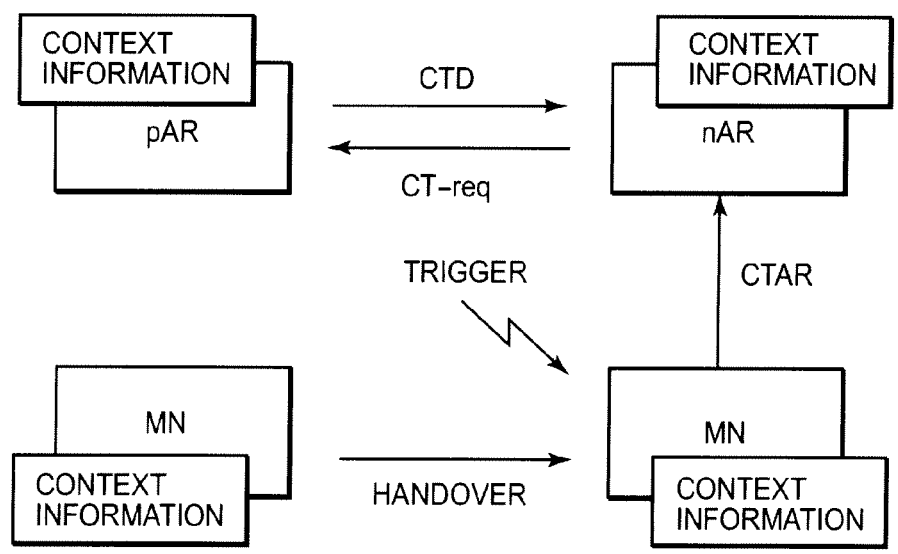
FIG. 14 is a diagram used to explain a conventional handover performed by a mobile node using CTD.
Figure 15:
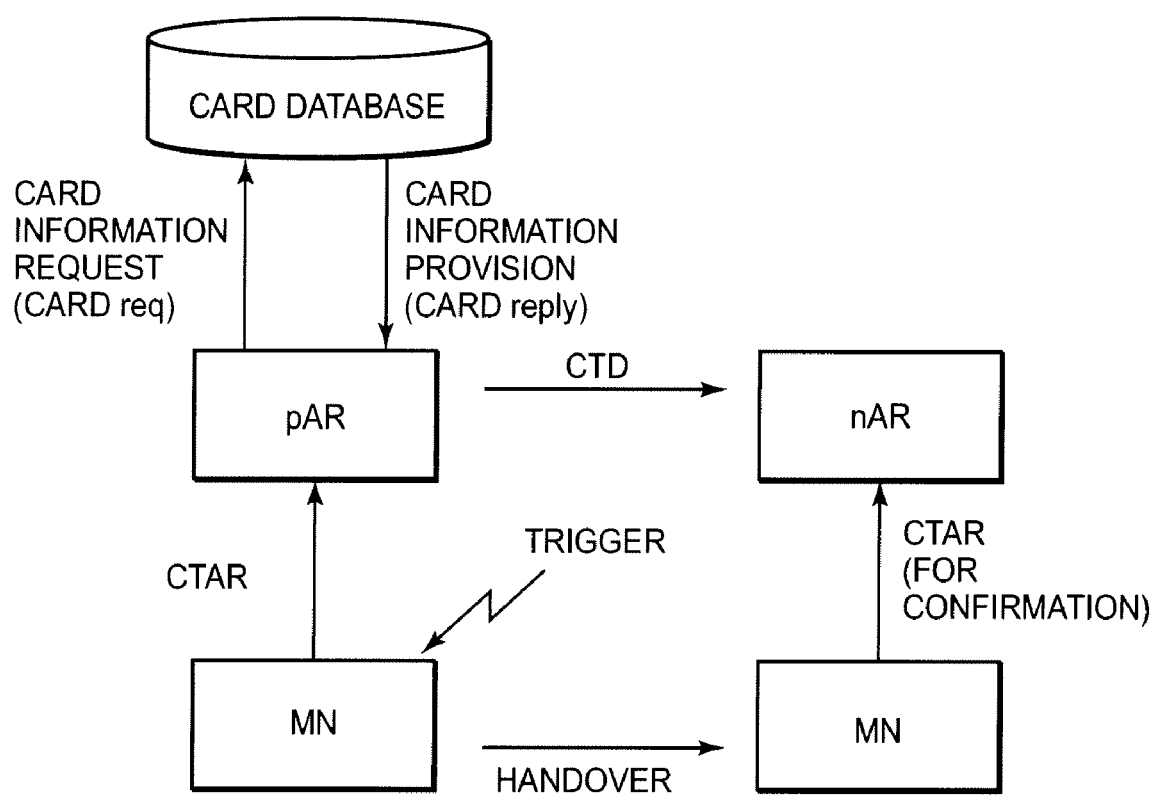
FIG. 15 is a diagram used to explain another conventional handover performed by the mobile node using the CTD.
Figure 16A:
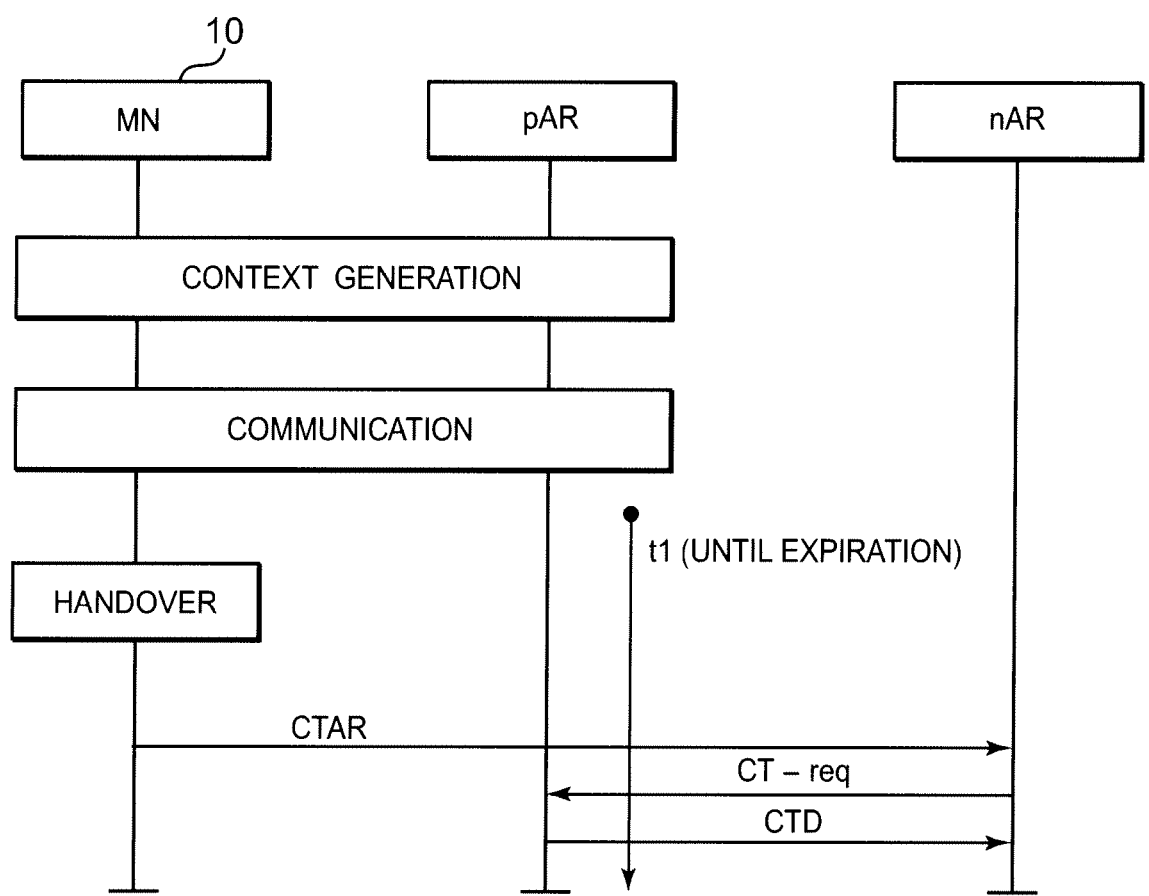
FIG. 16A is a sequence chart of when a CTD transfer is successfully performed after the conventional handover performed by the mobile node using the CTD.
Figure 16B:
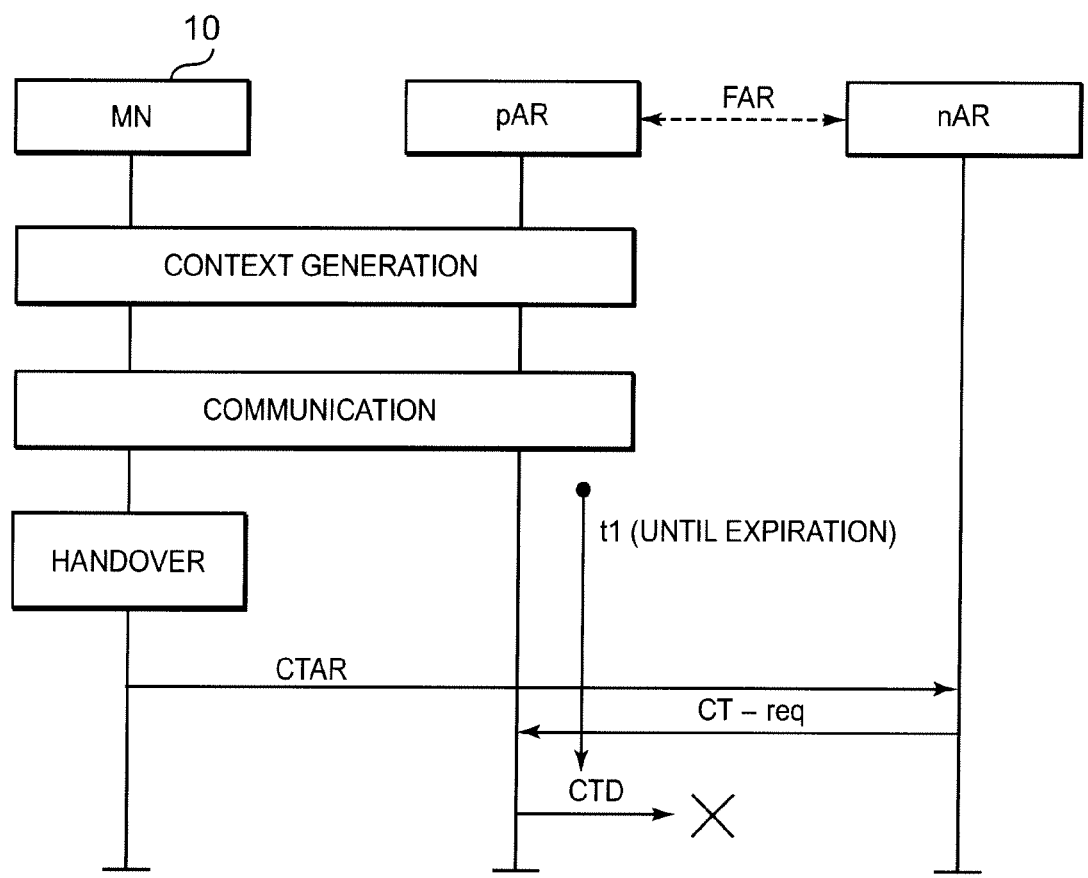
FIG. 16B is a sequence chart of when the CTD transfer is unsuccessfully performed after the conventional handover performed by the mobile node using the CTD.
Figure 17:
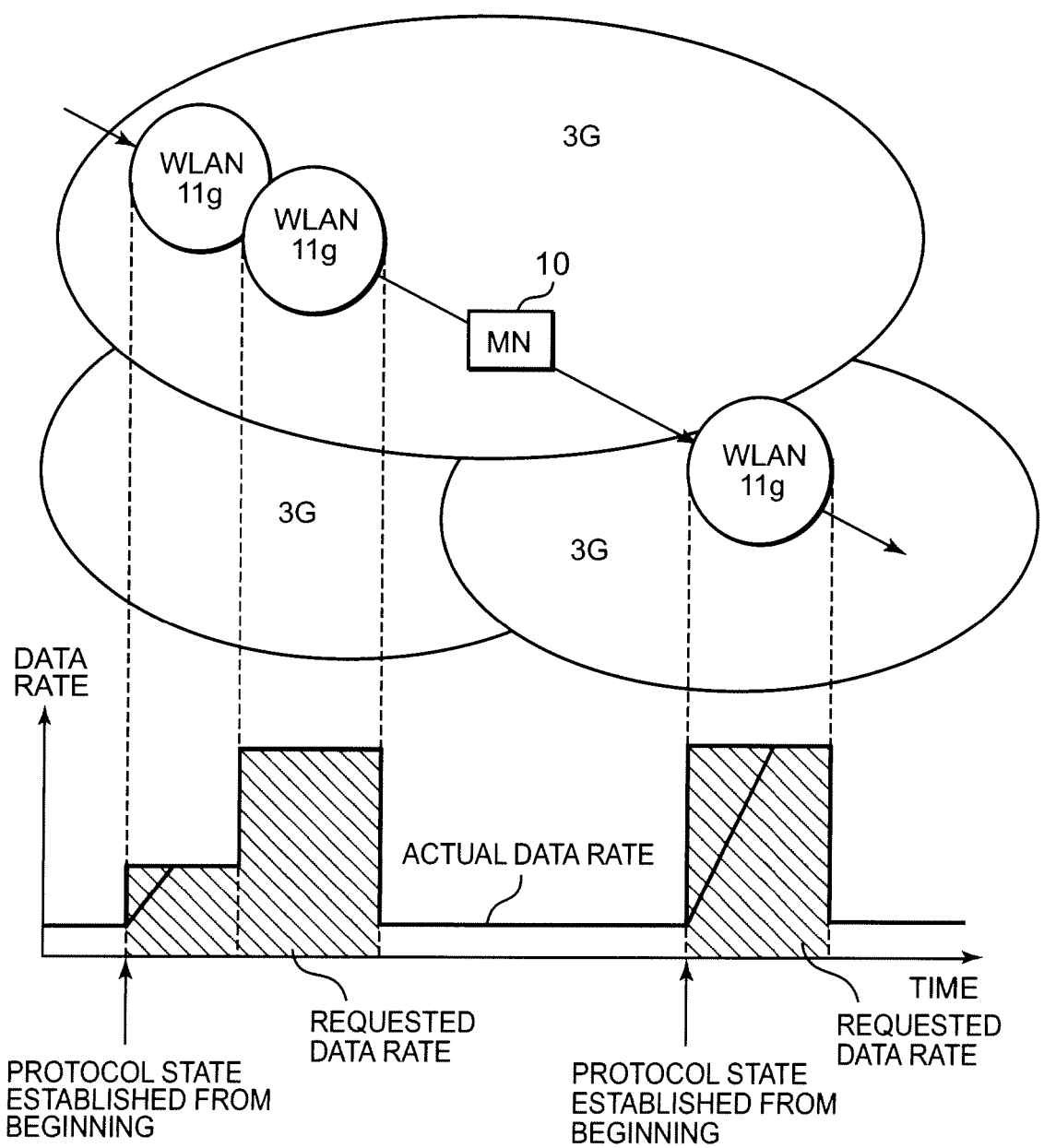
FIG. 17 is a diagram of an actual data rate of the handover performed by the conventional mobile node.

In addition to the above-described first to sixth embodiments, for example, as shown in FIG. 11, when CTD is generated between an MN 1100 and a pAR 1101 and communication is established, the MN 1100 transmits an activation sustain message to the pAR 1101, via the 3G or WLAN interface, before the handover. The activation sustain message gives an instruction for not allowing the CTD held by the pAR 1101 to enter the dormant state. The pAR 1101 sets a time T1 required until the CTD enters the dormant state to be unlimited or to an extremely long period of time based on the activation sustain message. As a result, the communication can be more efficiently established without the CTD expiring, even time is required until the MN 1100 performs a handover, the CTD held by the pAR 1101 is transmitted to an nAR 1102, and the communication by the MN 1100 performed via the nAR 1102 is established.

According to the above-described first to sixth embodiments, a mobile communication control method mainly related to layer 3 context mainly of communication between an MN and an AR is described. However, the mobile communication control method can be applied to context related to communication in other layers. For example, in layer 2 context, there is context used for communication between a communication terminal and a layer 2 entity within a network. Here, the layer 2 entity within a network can be a base station or a communication controlling station in a mobile phone network, such as Global System for Mobile (GSM), General Packet Radio Service (GPRS), 3G, and Worldwide Interoperability for Microwave Access (WiMax). Alternatively, the layer 2 entity can be an access point in a wireless LAN or Bluetooth. Moreover, the layer 2 context can be, for example, a Packet Data Convergence Protocol (PDCP) context in the mobile phone network, or a context when communication is performed between the access point and a terminal in the wireless LAN. Regarding the layer 2 context such as this, for example, the mobile communication control method of the present invention can be used when, for example, a layer 2 context held at a wireless LAN access point is sent to another wireless LAN access point via a 3G network. When the layer 2 context is controlled in this way, this is not limited to a layer 3 means represented by CTP when possible.

A mobile node of the present invention is a terminal device having individual substance. Alternatively, for example, the mobile node can be applied to a logical presence mounted by software or the like, that moves as a logical entity between fixed stations that are connection points of an actual mobile node and provides a mobile network to the mobile node.

Each functional block used in the explanations of each embodiment of the present embodiment, described above, can be realized as a large scale integration (LSI) that is typically an integrated circuit. Each functional block can be individually formed into a single chip. Alternatively, some or all of the functional blocks can be included and formed into a single chip. Although referred to here as the LSI, depending on differences in integration, the integrated circuit can be referred to as the integrated circuit (IC), a system LSI, a super LSI, or an ultra LSI. The method of forming the integrated circuit is not limited to LSI and can be actualized by a dedicated circuit or a general-purpose processor. A field programmable gate array (FPGA) that can be programmed after LSI manufacturing or a reconfigurable processor of which connections and settings of the circuit cells within the LSI can be reconfigured can be used. Furthermore, if a technology for forming the integrated circuit that can replace LSI is introduced as a result of the advancement of semiconductor technology or a different derivative technology, the integration of the functional blocks can naturally be performed using the technology. For example, the application of biotechnology is a possibility.

INDUSTRIAL APPLICABILITY

The mobile communication control method, the mobile node, and the access router allow communication to be continued after a handover without newly re-establishing all protocol states from the beginning. Therefore, the mobile communication control method, the mobile node, and the access router are useful in, for example, a mobile communication control method, mobile node, and access router used when a mobile node communicates over an area configured by a plurality of different communication networks.

The invention claimed is:

1. A mobile communication control method for allowing continuous and efficient communication when a mobile node having a plurality of interfaces respectively corresponding to a plurality of different communication networks and performing communication over respective areas of the plurality of different communication networks via the respectively corresponding plurality of interfaces performs communication with a correspondent node via a first access router configuring a subnet of a predetermined communication network among the plurality of different communication networks and, as a result of a handover by the mobile node, performs communication with the correspondent node via a second access router configuring another subnet of the predetermined communication network, the mobile communication control method comprising the steps of:

transmitting a sustain request message, by the mobile node, to an access router via any of the plurality of interfaces, the access router holding communication environment information related to an environment of communication performed via the first access router and configured to expire after an elapse of a predetermined amount of time, the sustain request message stopping the communication environment information from expiring after the elapse of the predetermined amount of time;

resetting, by the access router that has received the sustain request message, the predetermined amount of time until expiration based on the sustain request message; and establishing, by the second access router, a communication environment for communication by the mobile node performed via the second access router based on the communication environment information sustained by the sustain request message.

2. The mobile communication control method according to claim 1, wherein:

the mobile node periodically transmits the sustain request message at a time interval shorter than the predetermined amount of time until the communication environment information expires.

3. The mobile communication control method according to claim 1, wherein:

the mobile node transmits the sustain request message to the first access router via any of the plurality of interfaces until the handover by the mobile node is completed, the first access router holding the communication environment information.

4. The mobile communication control method according to claim 1, wherein:
the mobile node transmits a communication environment information acquisition message instructing acquisition of the communication environment information held by the first access router to the second access router, and
the mobile node transmits the sustain request message to the second access router via any of the plurality of interfaces, the second access router having acquired the communication environment information based on the communication environment information acquisition message.

5. The mobile communication control method according to claim 4, wherein:
the first access router transmits a notification that the communication environment information has been transmitted to the second access router to the mobile node.

6. The mobile communication control method according to claim 1, wherein:
the mobile node transmits the sustain request message to the first access router via any of the plurality of interfaces until the handover by the mobile node is completed, the first access router holding the communication environment information,
the mobile node transmits a communication environment information acquisition message instructing acquisition of the communication environment information held by the first access router to the second access router after the handover is completed, and
the mobile node transmits the sustain request message to the second access router via any of the plurality of interfaces, the second access router having acquired the communication environment information based on the communication environment information acquisition message.

7. The mobile communication control method according to claim 6, wherein:
the first access router transmits a notification that the communication environment information has been transmitted to the second access router to the mobile node.

8. The mobile communication control method according to claim 1, wherein:
the mobile node acquires prediction information from an access router prediction information providing terminal that provides the prediction information for predicting an access router of a handover destination,
the mobile node transmits a communication environment information acquisition message instructing acquisition of the communication environment information held by the first access router to the second access router based on the acquired prediction information, and
the mobile node transmits the sustain request message to the second access router via any of the plurality of interfaces, the second access router having acquired the communication environment information based on the received communication environment information acquisition message.

9. The mobile communication control method according to claim 8, wherein:
the first access router transmits a notification that the communication environment information has been transmitted to the second access router to the mobile node.

10. The mobile communication control method according to claim 1, wherein:
the mobile node transmits the sustain request message to the first access router via any of the plurality of interfaces, the first access router holding the communication environment information,
the mobile node transmits a communication environment information acquisition message instructing acquisition of the communication environment information held by the first access router to the second access router based on prediction information acquired from an access router prediction information providing terminal that provides the prediction information for predicting an access router of a handover destination, and
the mobile node transmits the sustain request message to the second access router via any of the plurality of interfaces, the second access router having acquired the communication environment information based on the received communication environment information acquisition message.

11. The mobile communication control method according to claim 10, wherein:
the first access router transmits a notification that the communication environment information has been transmitted to the second access router to the mobile node.

12. A mobile communication control method for allowing continuous and efficient communication when a mobile node having a plurality of interfaces respectively corresponding to a plurality of different communication networks and performing communication over respective areas of the plurality of different communication networks via the respectively corresponding plurality of interfaces performs communication with a correspondent node via a first access router configuring a subnet of a predetermined communication network among the plurality of different communication networks and, as a result of a handover by the mobile node, performs communication with the correspondent node via a second access router configuring another subnet of the predetermined communication network, the mobile communication control method comprising the steps of:
transmitting a communication environment information acquisition message, by the mobile node, to the second access router via a predetermined interface among the plurality of interfaces, before communication environment information held by the first access router expires after an elapse of a predetermined amount of time, the first access router holding the communication environment information related to an environment of communication performed via the first access router and configured to expire after the elapse of the predetermined amount of time, and the communication environment information acquisition message instructing acquisition of the communication environment information; and
acquiring, by the second access router, the communication environment information from the first access router based on the communication environment information acquisition message and establishing a communication environment for communication by the mobile node performed via the second access router based on the acquired communication environment information.

13. The mobile communication control method according to claim 12, wherein:
the mobile node decides the second access router to which to transmit the communication environment information acquisition message based on prediction information acquired from an access router prediction information providing terminal that provides the prediction information for predicting an access router of a handover destination.

14. A mobile node used in a mobile communication control method for allowing continuous and efficient communication when the mobile node having a plurality of interfaces respectively corresponding to a plurality of different communication networks and performing communication over respective areas of the plurality of different communication networks via the respectively corresponding plurality of interfaces performs communication with a correspondent node via a first access router configuring a subnet of a predetermined communication network among the plurality of different communication networks and, as a result of a handover by the mobile node, performs communication with the correspondent node via a second access router configuring another subnet of the predetermined communication network, the mobile node comprising:
- a generating unit that generates a sustain request message for an access router holding communication environment information related to an environment of communication performed via the first access router and configured to expire after an elapse of a predetermined amount of time, the sustain request message stopping the communication environment information from expiring after the elapse of the predetermined amount of time and
- a transmitting unit that transmits the generated sustain request message via any of the plurality of interfaces.

15. The mobile node according to claim 14, wherein:
the transmitting unit periodically transmits the sustain request message at a time interval shorter than the predetermined amount of time until the communication environment information expires.

16. The mobile node according to claim 14, wherein:
the transmitting unit transmits the generated sustain request message to the first access router via any of the plurality of interfaces until the handover by the mobile node is completed, the first access router holding the communication environment information.

17. The mobile node according to claim 14, wherein:
the transmitting unit transmits a communication environment information acquisition message instructing acquisition of the communication environment information held by the first access router to the second access router, and
the transmitting unit transmits the sustain request message to the second access router via any of the plurality of interfaces, the second access router having acquired the communication environment information based on the communication environment information acquisition message.

18. The mobile node according to claim 17, further comprising:
a receiving unit that receives a message from an external source;
wherein, the receiving unit receives a notification from the first access router that the communication environment information has been transmitted to the second access router.

19. The mobile node according to claim 14, wherein:
the transmitting unit transmits the sustain request message to the first access router via any of the plurality of interfaces until the handover by the mobile node is completed, the first access router holding the communication environment information,
the transmitting unit transmits a communication environment information acquisition message instructing acquisition of the communication environment information held by the first access router to the second access router after the handover is completed, and
the transmitting unit transmits the sustain request message to the second access router via any of the plurality of interfaces, the second access router having acquired the communication environment information based on the communication environment information acquisition message.

20. The mobile node according to claim 19, further comprising:
a receiving unit that receives a message from an external source;
wherein, the receiving unit receives a notification from the first access router that the communication environment information has been transmitted to the second access router.

21. The mobile node according to claim 14, wherein:
the transmitting unit acquires prediction information from an access router prediction information providing terminal that provides the prediction information predicting an access router of a handover destination,
the transmitting unit transmits a communication environment information acquisition message instructing acquisition of the communication environment information held by the first access router to the second access router based on the acquired prediction information, and
the transmitting unit transmits the sustain request message to the second access router via any of the plurality of interfaces, the second access router having acquired the communication environment information based on the received communication environment information acquisition message.

22. The mobile node according to claim 21, further comprising:
a receiving unit that receives a message from an external source,
wherein, the receiving unit receives a notification from the first access router that the communication environment information has been transmitted to the second access router.

23. The mobile node according to claim 14, wherein:
the transmitting unit transmits the sustain request message to the first access router holding the communication environment information via any of the plurality of interfaces,
the transmitting unit transmits a communication environment information acquisition message instructing acquisition of the communication environment information held by the first access router to the second access router based on prediction information acquired from an access router prediction information providing terminal that provides the prediction information predicting an access router of a handover destination, and
the transmitting unit transmits the sustain request message to the second access router via any of the plurality of interfaces, the second access router having acquired the communication environment information based on the received communication environment information acquisition message.

24. The mobile node according to claim 23, further comprising:
a receiving unit that receives a message from an external source,
wherein, the receiving unit receives a notification from the first access router that the communication environment information has been transmitted to the second access router.

25. A mobile node used in a mobile communication control method for allowing continuous and efficient communication when the mobile node having a plurality of interfaces respectively corresponding to a plurality of different communication networks and performing communication over respective areas of the plurality of different communication networks via the respectively corresponding plurality of interfaces performs communication with a correspondent node via a first access router configuring a subnet of a predetermined communication network among the plurality of different communication networks and, as a result of a handover by the mobile node, performs communication with the correspondent node via a second access router configuring another subnet of the predetermined communication network, the mobile node comprising:

a generating unit that generates a communication environment information acquisition message for the second access router before communication environment information held by the first access router expires after an elapse of a predetermined amount of time, the first access router holding the communication environment information related to an environment of communication performed via the first access router and configured to expire after the elapse of the predetermined amount of time, and the communication environment information acquisition message instructing acquisition of the communication environment information; and a transmitting unit that transmits the generated communication environment information acquisition message via a predetermined interface among the plurality of interfaces.

26. The mobile node according to claim 25, further comprising:

a deciding unit that decides the second access router to which to transmit the communication environment information acquisition message based on prediction information acquired from an access router prediction information providing terminal that provides the prediction information for predicting an access router of a handover destination.

27. A communication control method to be performed by an access router for allowing continuous and efficient communication when a mobile node having a plurality of interfaces respectively corresponding to a plurality of different communication networks and performing communication over respective areas of the plurality of different communication networks via the respectively corresponding plurality of interfaces performs communication with a correspondent node via a first access router configuring a subnet of a predetermined communication network among the plurality of different communication networks and, as a result of a handover by the mobile node, performs communication with the correspondent node via a second access router configuring another subnet of the predetermined communication network, the communication control method to be performed by the access router comprising:

when the access router performs processes as the first access router, receiving a sustain request message from the mobile node via any of the plurality of interfaces until the handover by the mobile node is completed, the sustain request message stopping communication environment information from expiring after an elapse of a predetermined amount of time, and the communication environment information related to an environment of communication performed via the first access router and configured to expire after the elapse of the predetermined amount of time, and resetting the predetermined amount of time until expiration when the sustain request message is received; and when the access router performs processes as the second access router, acquiring the communication environment information sustained in the first access router, and establishing communication by the mobile node performed via the second access router based on the acquired communication environment information.

28. A communication control method to be performed by an access router for allowing continuous and efficient communication when a mobile node having a plurality of interfaces respectively corresponding to a plurality of different communication networks and performing communication over respective areas of the plurality of different communication networks via the respectively corresponding plurality of interfaces performs communication with a correspondent node via a first access router configuring a subnet of a predetermined communication network among the plurality of different communication networks and, as a result of a handover by the mobile node, performs communication with the correspondent node via a second access router configuring another subnet of the predetermined communication network, the communication control method to be performed by the access router comprising:

when the access router performs processes as the second access router, receiving a communication environment information acquisition message from the mobile node, the communication environment information acquisition message instructing acquisition of communication environment information held by the first access router, the communication environment information related to an environment of communication performed via the first access router and configured to expire after an elapse of a predetermined amount of time, acquiring the communication environment information based on the received communication environment information acquisition message, receiving a sustain request message from the mobile node via any of the plurality of interfaces, the sustain request message stopping the communication environment information from expiring after the elapse of the predetermined amount of time, resetting the predetermined amount of time until expiration when the sustain request message is received, and establishing a communication environment of communication by the mobile node performed via the second access router based on the communication environment information sustained by the sustain request message.

29. The communication control method to be performed by the access router according to claim 28, further comprising:

when the access router performs processes as the first access router, notifying the mobile node that the communication environment information has been acquired, after the second access router has acquired the communication environment information.

30. A communication control method to be performed by an access router for allowing continuous and efficient communication when a mobile node having a plurality of interfaces respectively corresponding to a plurality of different communication networks and performing communication over respective areas of the plurality of different communication networks via the respectively corresponding plurality of interfaces performs communication with a correspondent node via a first access router configuring a subnet of a predetermined communication network among the plurality of different communication networks and, as a result of a handover by the mobile node, performs communication with the correspondent node via a second access router configuring another subnet of the predetermined communication network, the communication control method to be performed by the access router comprising:

when the access router performs processes as the first access router,
receiving a sustain request message from the mobile node via any of the plurality of interfaces until the handover by the mobile node is completed, the sustain request message stopping communication environment information from expiring after an elapse of a predetermined amount of time, and the communication environment information related to an environment of communication performed via the first access router and configured to expire after the elapse of the predetermined amount of time, and
resetting the predetermined amount of time until expiration when the sustain request message is received; and
when the access router performs processes as the second access router,
receiving a communication environment information acquisition message from the mobile node, the communication environment information acquisition message instructing acquisition of the communication environment information held by the first access router,
acquiring the communication environment information based on the received communication environment information acquisition message,
receiving the sustain request message from the mobile node via any of the plurality of interfaces,
resetting the predetermined amount of time until expiration when the sustain request message is received, and
establishing a communication environment of communication by the mobile node performed via the second access router based on the communication environment information sustained by the sustain request message.

31. The communication control method to be performed by the access router according to claim 30, further comprising:
when the access router performs processes as the first access router,
notifying the mobile node that the communication environment information has been acquired, after the second access router has acquired the communication environment information.

32. A communication control method to be performed by an access router for allowing continuous and efficient communication when a mobile node having a plurality of interfaces respectively corresponding to a plurality of different communication networks and performing communication over respective areas of the plurality of different communication networks via the respectively corresponding plurality of interfaces performs communication with a correspondent node via a first access router configuring a subnet of a predetermined communication network among the plurality of different communication networks and, as a result of a handover by the mobile node, performs communication with the correspondent node via a second access router configuring another subnet of the predetermined communication network, the communication control method to be performed by the access router comprising:

when the access router performs processes as the second access router,
receiving a communication environment information acquisition message from the mobile node, the communication environment information acquisition message instructing acquisition of communication environment information held by the first access router, the communication environment information related to an environment of communication performed via the first access router and configured to expire after an elapse of a predetermined amount of time,
acquiring the communication environment information based on the received communication environment information acquisition message,
receiving a sustain request message from the mobile node via any of the plurality of interfaces, the sustain request message stopping the communication environment information from expiring after the elapse of the predetermined amount of time,
resetting the predetermined amount of time until expiration when the sustain request message is received, and
establishing a communication environment of communication by the mobile node performed via the second access router based on the communication environment information sustained by the sustain request message.

33. The communication control method to be performed by the access router according to claim 32, further comprising:
when the access router performs processes as the first access router,
notifying the mobile node that the communication environment information has been acquired, after the second access router has acquired the communication environment information.

34. A communication control method to be performed by an access router for allowing continuous and efficient communication when a mobile node having a plurality of interfaces respectively corresponding to a plurality of different communication networks and performing communication over respective areas of the plurality of different communication networks via the respectively corresponding plurality of interfaces performs communication with a correspondent node via a first access router configuring a subnet of a predetermined communication network among the plurality of different communication networks and, as a result of a handover by the mobile node, performs communication with the correspondent node via a second access router configuring another subnet of the predetermined communication network, the communication control method to be performed by the access router comprising:

when the access router performs processes as the first access router,
receiving a sustain request message from the mobile node via any of the plurality of interfaces until the handover by the mobile node is completed, the sustain request message stopping communication environment information from expiring after an elapse of a predetermined amount of time and the communication environment information related to an environment of communication performed via the first access router and configured to expire after the elapse of the predetermined amount of time, and
resetting the predetermined amount of time until expiration when the sustain request message is received; and
when the access router performs processes as the second access router,
receiving a communication environment information acquisition message from the mobile node instructing acquisition of the communication environment information held by the first access router, acquiring the communication environment information based on the received communication environment information acquisition message, receiving the sustain request message from the mobile node via any of the plurality of interfaces, resetting the predetermined amount of time until expiration when the sustain request message is received, and establishing a communication environment of communication by the mobile node performed via the second access router based on the communication environment information sustained by the sustain request message.

35. The communication control method to be performed by the access router according to claim 34, further comprising:
when the access router performs processes as the first access router,
notifying the mobile node that the communication environment information has been acquired, after the second access router has acquired the communication environment information.

36. The communication control method to be performed by the access router according to claim 27, wherein:
the sustain request message is periodically received from the mobile node at a time interval shorter than the predetermined amount of time until the communication environment information expires.

37. A communication control method to be performed by an access router for allowing continuous and efficient communication when a mobile node having a plurality of interfaces respectively corresponding to a plurality of different communication networks and performing communication over respective areas of the plurality of different communication networks via the respectively corresponding plurality of interfaces performs communication with a correspondent node via a first access router configuring a subnet of a predetermined communication network among the plurality of different communication networks and, as a result of a handover by the mobile node, performs communication with the correspondent node via a second access router configuring another subnet of the predetermined communication network, the communication control method to be performed by the access router comprising:
when the access router performs processes as the second access router,
receiving a communication environment information acquisition message from the mobile node via a predetermined interface among the plurality of interfaces before communication environment information held by the first access router expires after an elapse of a predetermined amount of time, the first access router holding the communication environment information related to an environment of communication performed via the first access router and configured to expire after the elapse of the predetermined amount of time, and the communication environment information acquisition message instructing acquisition of the communication environment information, and
acquiring the communication environment information from the first access router based on the received communication environment information acquisition message, and establishing a communication environment of communication by the mobile node performed via the second access router based on the acquired communication environment information.

38. The communication control method to be performed by the access router according to claim 37, wherein:
a transmission destination of the communication environment information acquisition message received from the mobile node is decided based on prediction information acquired from an access router prediction information providing terminal that provides the prediction information for predicting an access router of a handover destination.

* * * * *

UNITED STATES PATENT AND TRADEMARK OFFICE
CERTIFICATE OF CORRECTION

| | | |
|---|---|---|
| PATENT NO. | : 8,107,453 B2 | Page 1 of 1 |
| APPLICATION NO. | : 12/280679 | |
| DATED | : January 31, 2012 | |
| INVENTOR(S) | : Takashi Aramaki et al. | |

It is certified that error appears in the above-identified patent and that said Letters Patent is hereby corrected as shown below:

Title Page, Item 56, References Cited, Other Publications, page 2, column 2, line 4, in the Letters Patent issued on January 31, 2012, incorrectly reads:

"M. Liebsch, et al., "Candidate Access Ruter Discovery," (draft-ietf-"

and should read:

"M. Liebsch, et al., "Candidate Access Router Discovery," (draft-ietf-"

Claim 14, column 31, line 23, incorrectly reads:

"after the elapse of the predetermined amount of time and"

and should read:

"after the elapse of the predetermined amount of time; and"

Claim 15, column 31, line 27, incorrectly reads:

"the transmitting unit periodically transmits the sustain"

and should read:

"the transmitting unit periodically transmits the generated sustain"

Claim 34, column 36, line 55, incorrectly reads:

"amount of time and the communication environment"

and should read:

"amount of time, and the communication environment"

Signed and Sealed this
Fifteenth Day of May, 2012

David J. Kappos
*Director of the United States Patent and Trademark Office*